(12) United States Patent (10) Patent No.: US 12,150,004 B2
Lu et al. (45) Date of Patent: Nov. 19, 2024

(54) MOBILE HANDOVER METHOD AND RELATED DEVICE

(71) Applicant: Huawei Technologies Co., Ltd., Shenzhen (CN)

(72) Inventors: Wei Lu, Shenzhen (CN); Dewang Ren, Xi'an (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 558 days.

(21) Appl. No.: 17/236,720

(22) Filed: Apr. 21, 2021

(65) Prior Publication Data

US 2021/0250838 A1 Aug. 12, 2021

Related U.S. Application Data

(63) Continuation of application No. PCT/CN2019/112423, filed on Oct. 22, 2019.

(30) Foreign Application Priority Data

Oct. 22, 2018 (CN) .......................... 201811232968.1

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0016* (2013.01); *H04W 36/08* (2013.01); *H04W 76/11* (2018.02)

(58) Field of Classification Search
CPC . H04W 36/32; H04W 36/0016; H04W 36/08; H04W 76/11; H04W 36/0055;
(Continued)

(56) References Cited

U.S. PATENT DOCUMENTS 8,630,260 B2 1/2014 Takamura
9,119,114 B2 8/2015 Bi et al.
(Continued)

FOREIGN PATENT DOCUMENTS

CN 102065500 A 5/2011
CN 102724648 A 10/2012
(Continued)

OTHER PUBLICATIONS

3GPP TS 23.501 V15.3.0 (Sep. 2018), 3rd Generation Partnership Project; Technical Specification Group Services and System Aspects; System Architecture for the 5G System; Stage 2(Release 15), 226 pages.

(Continued)

*Primary Examiner* — Dady Chery
(74) *Attorney, Agent, or Firm* — Slater Matsil, LLP

(57) ABSTRACT

The embodiments of the application disclose a mobile handover method. The method includes: a first network device receives first information, and learns that a first terminal device is handed over to a target access network device. The first network device sends second information to a second network device, and the second network device determines, based on the second information, whether to reselect a target user plane function device for the first terminal device; and/or the first network device sends third information to a third network device, and the third network device determines, based on the third information, whether to reselect a target application server for the first terminal device. If the target user plane function device and/or the target application server need/needs to be reselected, a user plane function device and/or an application server need/needs to be handed over in a timely manner.

17 Claims, 12 Drawing Sheets

(51) Int. Cl.
*H04W 36/08* (2009.01)
*H04W 76/11* (2018.01)

(58) Field of Classification Search
CPC .......... H04W 36/00835; H04W 36/12; H04W 36/0088
See application file for complete search history.

(56) References Cited

U.S. PATENT DOCUMENTS

| | | | |
|---|---|---|---|
| 10,911,990 | B2 | 2/2021 | Ying et al. |
| 10,945,194 | B2 | 3/2021 | Lou et al. |
| 11,323,920 | B2 | 5/2022 | Shi et al. |
| 2010/0056156 | A1* | 3/2010 | Xu .................. H04B 1/406 455/436 |
| 2011/0110336 | A1* | 5/2011 | Takamura .......... H04W 36/30 370/332 |
| 2017/0332282 | A1 | 11/2017 | Dao |
| 2018/0027610 | A1* | 1/2018 | Werner ............. H04W 36/34 370/331 |
| 2018/0192390 | A1 | 7/2018 | Li et al. |
| 2020/0008109 | A1* | 1/2020 | Li .................... H04W 36/08 |

FOREIGN PATENT DOCUMENTS

| | | |
|---|---|---|
| CN | 107087255 A | 8/2017 |
| CN | 107734573 A | 2/2018 |
| CN | 108366365 A | 8/2018 |
| CN | 108401271 A | 8/2018 |
| CN | 108605259 A | 9/2018 |
| CN | 108632944 A | 10/2018 |
| JP | 2016077009 A | 5/2016 |
| WO | 2018161850 A1 | 9/2018 |

OTHER PUBLICATIONS

ETRI, 23.501: Network Function Selection in 5G. SA WG2 Meeting #118bis Jan. 16-20, 2017, S2-170229, 4 pages, Spokane, WA, USA.

LG Electronics et al, "Conclusion of Solution#8", SA WG2 Meeting #129, S2-1810858, Oct. 15-19, 2018, 4 pages, Dongguan, P.R. China.

Huawei et al, "Update to procedures to support service continuity in ULCL scenario", SA WG2 Meeting #122 bis, S2-175633, Aug. 21-25, 2017, 8 pages, Sophia Antipolis, France.

* cited by examiner

MOBILE HANDOVER METHOD AND RELATED DEVICE

CROSS-REFERENCE TO RELATED APPLICATIONS

This application is a continuation of International Application No. PCT/CN2019/112423, filed on Oct. 22, 2019, which claims priority to Chinese Patent Application No. 201811232968.1, filed on Oct. 22, 2018. The disclosures of the aforementioned applications are hereby incorporated by reference in their entireties.

TECHNICAL FIELD

The present disclosure relates to the field of communications technologies, and in particular, to a mobile handover method and a related device.

BACKGROUND

With development of a 5G network, a user plane function (UPF) device is moved down to a network boundary closer to a user. Similarly, to improve service experience of the user, an application server at an application layer may also be moved down, so that mobile edge computing (MEC) becomes possible. However, a new challenge needs to be addressed. In a movement process of user equipment (UE), because of a change in the user plane function device and/or the application server, a service layer interruption may occur. This affects the service experience of the user. How to reduce impact of the change on continuity and reliability of application services to improve user experience becomes an urgent problem to be resolved.

To overcome impact caused by congestion and mobile handover at a transport layer, corresponding processing methods are deployed at the application layer to alleviate these problems. However, how the application layer prepares for a mobile handover event in advance is a key step for ensuring the service experience of the user.

A solution is to predict a mobile handover time of the UE, and predict, based on movement information of the UE, a handover time, a handover object, and a time of passing through a cell during cell handover in the movement process of the UE. On this basis, a target server is selected to provide a service for the UE. This method has a relatively high demand on precision of a prediction algorithm and a computing capability of a server. The method mainly depends on a third-party location navigation application, and a prediction precision is not high. In addition, because a third-party application cannot obtain a deployment status of mobile network devices of an operator, a predicted handover time may be premature or delayed, or a predicted handover object may be incorrect. Therefore, how to determine a processing manner on service continuity based on a handover event of the UE is a technical problem that urgently needs to be resolved currently.

SUMMARY

Embodiments of the present invention provide a mobile handover method and a related device, to quickly and accurately determine, for UE on which mobile handover occurs, whether a new UPF and/or a new AS need/needs to be reselected, so as to prepare in advance for the mobile handover of the UE, and ensure continuity and reliability of communication of the UE.

According to a first aspect, an embodiment of the present invention provides a mobile handover method, applied to a first network device side. The method includes: A first network device receives first information, where the first information indicates handover of a first terminal device to a target access network device. The first network device sends second information to a second network device based on the first information, where the second information is used by the second network device to determine whether to reselect a target user plane function device for the first terminal device; and/or the first network device sends third information to a third network device based on the first information, where the third information is used by the third network device to determine whether to reselect a target application server for the first terminal device.

According to the method described in the first aspect, after obtaining a mobile handover event of a terminal device, the first network device can report the mobile handover event to the second network device in a timely manner, and the second network device reselects a user plane function device for the terminal device. Alternatively, the first network device reports the mobile handover event to the third network device in a timely manner, and the third network device reselects an application server for the terminal device. In this way, the user plane function device or the application server can be handed over for the terminal device in a timely manner, to prepare for mobile handover of the terminal device in advance, so as to avoid a packet loss, frame freezing, or the like that occurs on the terminal device in a short period of time, improve service experience of a user, improve network resource utilization, and reduce a service handover delay.

In a possible design, that a first network device receives first information includes: The first network device receives the first information in a handover preparation phase of UE, or the first network device receives the first information in a handover execution phase of UE.

In a possible design, that a first network device receives first information includes: The first network device receives the first information sent by a source access network device, where the first information is sent by the source access network device when the source access network device determines that the first terminal device is handed over.

Optionally, after the source access network device obtains a response message sent by the target access network device indicating that the handover is agreed, the source access network device sends the first information to the first terminal device.

According to this embodiment of the present invention, after obtaining the response message of the target access network device and indicating that the handover is agreed, the source access network device can send the mobile handover event of the terminal device to the first network device as soon as possible, so that the first network device instructs the second network device to reselect the user plane function device for the terminal device as soon as possible. Alternatively, the third network device is instructed as soon as possible to reselect the application server for the terminal device, so as to avoid a packet loss, frame freezing, or the like that occurs on the terminal device in a short period of time, improve service experience of a user, improve network resource utilization, and reduce a service handover delay.

In a possible design, the second information includes information about the target access network device to which the first terminal device is handed over, and the information about the target access network device is used by the second network device to determine whether to reselect the target user plane function device for the first terminal device. Alternatively, the second information includes information about the target application server, and the information about the target application server is used by the second network device to determine whether to reselect the target user plane function device for the first terminal device.

In a possible design, the third information includes information about the target access network device to which the first terminal device is handed over, and the information about the target access network device is used by the third network device to determine whether to reselect the target application server for the first terminal device. Alternatively, the method further includes: The first network device receives information about the target user plane function device sent by the second network device, where the third information includes the information about the target user plane function device, and the information about the target user plane function device is used by the third network device to determine whether to reselect the target application server for the first terminal device.

In a possible design, the first network device includes a network exposure function (NEF) device, and/or the second network device includes a session management function (SMF) device, and/or the third network device includes a source application server (AS) already connected to the first terminal device.

According to a second aspect, an embodiment of the present invention provides a mobile handover method, applied to a second network device side. The method includes: A second network device receives second information sent by a first network device, where the second information is sent by the first network device when the first network device learns that a first terminal device is handed over to a target access network device. The second network device determines, based on the second information, whether to reselect a target user plane function device for the first terminal device.

According to the method described in the second aspect, after obtaining a mobile handover event of a terminal device, the first network device can report the mobile handover event to the second network device in a timely manner, and the second network device reselects a user plane function device for the terminal device, so that the user plane function device is handed over for the terminal device in a timely manner, thereby preparing for mobile handover of the terminal device in advance, so as to avoid a packet loss, frame freezing, or the like that occurs in a short period of time, improve service experience of a user, improve network resource utilization, and reduce a service handover delay.

In a possible design, after the second network device determines, based on the second information, whether to reselect the target user plane function device for the first terminal device, the method further includes: The second network device determines to reselect the target user plane function device for the first terminal device. The second network device sends information about the target user plane function device to the first network device.

In a possible design, the second information includes information about the target access network device to which the first terminal device is handed over. That the second network device determines, based on the second information, whether to reselect a target user plane function device for the first terminal device includes: The second network device determines, based on location information of the target access network device, whether to reselect the target user plane function device for the first terminal device. Alternatively, the second information includes information about a target application server reselected by a third network device for the first terminal device. That the second network device determines, based on the second information, whether to reselect a target user plane function device for the first terminal device includes: The second network device determines, based on location information of the target application server, whether to reselect the target user plane function device for the first terminal device.

In a possible design, the first network device includes an NEF, and/or the second network device includes an SMF.

According to a third aspect, an embodiment of the present invention provides a mobile handover method, applied to a third network device side. The method includes: A third network device receives third information sent by a first network device, where the third information is sent by the first network device when the first network device learns that a first terminal device is handed over to a target access network device. The third network device determines, based on the third information, whether to reselect a target application server for the first terminal device.

According to the method described in the second aspect, after obtaining a mobile handover event of a terminal device, the first network device can report the mobile handover event to the third network device in a timely manner, and the third network device reselects an application server for the terminal device, so that the application server is handed over for the terminal device in a timely manner, thereby preparing for mobile handover of the terminal device in advance, so as to avoid a packet loss, frame freezing, or the like that occurs in a short period of time, improve service experience of a user, improve network resource utilization, and reduce a service handover delay.

In a possible design, the third information includes information about the target access network device to which the first terminal device is handed over. That the third network device determines, based on the third information, whether to reselect a target application server for the first terminal device includes: The third network device determines, based on location information of the target access network device, whether to reselect the target application server for the first terminal device. Alternatively, the third information includes information about a target user plane function device reselected by a second network device for the first terminal device. That the third network device determines, based on the third information, whether to reselect a target application server for the first terminal device includes: The third network device determines, based on location information of the target user plane function device, whether to reselect the target application server for the first terminal device. Alternatively, that the third network device determines, based on the third information, whether to reselect a target application server for the first terminal device includes: The third network device determines, based on current quality of service of the first terminal device, whether to reselect the target application server for the first terminal device.

In a possible design, after the determining whether to reselect a target application server for the first terminal device, the method further includes: The third network device reselects the target application server for the first terminal device based on one or more of the current quality of service of the first terminal device, the location information of the target access network device to which the first terminal device is handed over, or the information about the target user plane function device. The third network device adds a first identifier to the last one or more data packets sent to the first terminal device. The third network device sends, to the first terminal device via a source user plane function device, a data packet carrying the first identifier, where the first identifier is used to indicate the source user plane function device to hand over data of the first terminal device to the target user plane function device. According to this embodiment of the present invention, after the mobile handover is performed on the terminal device, if a new target user plane function device is reselected, a new communications path needs to be established to hand over the user plane function device, so that the target user plane function device can provide a service for the terminal device in a timely manner after the terminal device is handed over.

In a possible design, the first network device includes an NEF, and/or the third network device includes a source AS already connected to the first terminal device.

According to a fourth aspect, an embodiment of the present invention provides a mobile handover method, applied to a fourth network device side. The method includes: A fourth network device receives fourth information, where the fourth information indicates handover of a first terminal device to a target access network device. The fourth network device reselects a sixth network device for the first terminal device based on a pre-created network link model and/or information about a fifth network device. The fifth network device is a target user plane function device determined for the first terminal device, and the sixth network device is a target application server determined for the first terminal device. Alternatively, the fifth network device is a target application server determined for the first terminal device, and the sixth network device is a target user plane function device determined for the first terminal device. The network link model is created based on one or more of information about a second terminal device, location information of an access network device connected to the second terminal device, location information of a user plane function device that provides a user plane service for the second terminal device, location information of an application server that provides an application service for the second terminal device, and quality of service of the second terminal device, where the information about the second terminal device includes one or more of location information, a movement trajectory, and a movement speed.

According to the method described in the fourth aspect, after obtaining a mobile handover event of a terminal device, the fourth network device can determine, based on a pre-created model, the target user plane function device or the target application server to which the terminal device is handed over. In this way, the user plane function device or the application server can be handed over for the terminal device in a timely manner, to prepare for mobile handover of the terminal device in advance, so as to avoid a packet loss, frame freezing, or the like that occurs on the terminal device in a short period of time, improve service experience of a user, improve network resource utilization, and reduce a service handover delay.

In a possible design, that a fourth network device receives fourth information includes: The fourth network device receives the fourth information in a handover preparation phase of UE, or the fourth network device receives the fourth information in a handover execution phase of UE.

In a possible design, after the fourth network device receives the fourth information, and before the fourth network device reselects the sixth network device for the first terminal device based on the pre-created network link model and/or the information about the fifth network device, the method further includes: The fourth network device sends fifth information to a seventh network device, where the fifth information is used by the seventh network device to determine whether to reselect the fifth network device for the first terminal device. The fourth network device receives the information about the fifth network device sent by the seventh network device. The seventh network device is a session management function device, the fifth network device is the target user plane function device determined for the first terminal device, and the sixth network device is the target application server determined for the first terminal device. Alternatively, the seventh network device is a source application server already connected to the first terminal device, the fifth network device is the target application server determined for the first terminal device, and the sixth network device is the target user plane function device determined for the first terminal device.

In a possible design, that a fourth network device receives fourth information includes: The fourth network device receives the fourth information sent by a source access network device, where the fourth information is sent by the source access network device when the source access network device determines that the first terminal device is handed over. The fourth network device receives the fourth information sent by an NEF, where the fourth information is received by the NEF from the source access network device.

In a possible design, the fourth network device includes a network data analytics NWDA function.

According to a fifth aspect, an embodiment of the present invention provides a mobile handover method, applied to a seventh network device side. The method includes: A seventh network device receives fifth information sent by a fourth network device, where the fifth information is sent by a first network device when the first network device learns that a first terminal device is handed over to a target access network device. The seventh network device determines, based on the fifth information, whether to reselect a fifth network device for the first terminal device. The seventh network device sends information about the fifth network device to the fourth network device, where the information about the fifth network device is used by the fourth network device to determine a sixth network device for the first terminal device. The seventh network device is a session management function device, the fifth network device is a target user plane function device determined for the first terminal device, and the sixth network device is a target application server determined for the first terminal device. Alternatively, the seventh network device is a source application server already connected to the first terminal device, the fifth network device is a target application server determined for the first terminal device, and the sixth network device is a target user plane function device determined for the first terminal device.

According to the method described in the fifth aspect, after obtaining a mobile handover event of a terminal device, the fourth network device can report the mobile handover event to the seventh network device in a timely manner, and the seventh network device reselects a user plane function device or an application server for the terminal device, so that the user plane function device or the application server is handed over for the terminal device in a timely manner, thereby preparing for mobile handover of the terminal device in advance, so as to avoid a packet loss, frame freezing, or the like that occurs in a short period of time, improve service experience of a user, improve network resource utilization, and reduce a service handover delay.

In a possible design, the seventh network device is the session management function device, the fifth network device is the target user plane function device reselected for the first terminal device, and the fifth information includes information about the target access network device to which the first terminal device is handed over. That the seventh network device determines, based on the fifth information, whether to reselect the fifth network device for the first terminal device includes: The seventh network device determines, based on location information of the target access network device, whether to reselect the target user plane function device for the first terminal device.

In a possible design, the seventh network device is the source application server already connected to the first terminal device, the fifth network device is the target application server reselected for the first terminal device, and the fifth information includes information about the target access network device to which the first terminal device is handed over. That the seventh network device determines, based on the fifth information, whether to reselect the fifth network device for the first terminal device includes: The seventh network device determines, based on current quality of service QoS of the first terminal device or location information of the target access network device, whether to reselect the target application server for the first terminal device.

In a possible design, after the seventh network device determines, based on the current quality of service QoS of the first terminal device or the location information of the target access network device, whether to reselect the target application server for the first terminal device, the method further includes: The source application server determines, based on the current quality of service of the first terminal device or the location information of the target access network device, to reselect the target application server for the first terminal device. The source application server adds a first identifier to the last one or more data packets sent to the first terminal device. The source application server sends, to the first terminal device via a source user plane function device, a data packet carrying the first identifier, where the first identifier is used to indicate the source user plane function device to hand over data of the first terminal device to the target user plane function device.

In a possible design, the fourth network device includes a network data analytics NWDA function.

In a possible design, after the source application server determines, based on the current quality of service of the first terminal device or the location information of the target access network device, to reselect the target application server for the first terminal device, the method further includes: The source application server reselects the target application server for the first terminal device based on one or more of the current quality of service of the first terminal device, the location information of the target access network device to which the first terminal device is handed over, or information about the target user plane function device. The source application server adds the first identifier to the last one or more data packets sent to the first terminal device. The source application server sends, to the first terminal device via the source user plane function device, the data packet carrying the first identifier, where the first identifier is used to indicate the source user plane function device to hand over data of the first terminal device to the target user plane function device. According to this embodiment of the present invention, after the mobile handover is performed on the terminal device, if a new target user plane function device is reselected, a new communications path needs to be established to hand over the user plane function device, so that the target user plane function device can provide a service for the terminal device in a timely manner after the terminal device is handed over.

According to a sixth aspect, an embodiment of the present invention provides a mobile handover method, applied to a source access network device side. The method includes: A source access network device sends a handover request to a target access network device, where the handover request indicates handover of a first terminal device from the source access network device to the target access network device. The source access network device receives a handover response sent by the target access network device. The source access network device sends first mobile handover information to the first network device within a preset time period after receiving the handover response, where the first mobile handover information is used to indicate handover of the first terminal device from the source access network device to the target access network device. The source access network device is located in a mobile handover preparation phase of the first terminal device within a preset time period after receiving the handover response.

According to this embodiment of the present invention, after obtaining a response message of the target access network device and indicating that handover is agreed, the source access network device can send a mobile handover event of a terminal device to the first network device as soon as possible, so that the first network device instructs, as soon as possible, a second network device to reselect a user plane function device for the terminal device or instructs a third network device to reselect an application server for the terminal device, so as to avoid a packet loss, frame freezing, or the like that occurs in a short period of time, improve service experience of a user, improve network resource utilization, and reduce a service switching delay.

According to a seventh aspect, an embodiment of the present invention provides a mobile handover method, applied to a source access network device side. The method includes: A source access network device sends a handover request to a target access network device, where the handover request indicates handover of a first terminal device from the source access network device to the target access network device. The source access network device receives a handover response sent by the target access network device. The source access network device sends first mobile handover information to a fourth network device within a preset time period after receiving the handover response, where the first mobile handover information is used to indicate handover of the first terminal device from the source access network device to the target access network device.

According to this embodiment of the present invention, after obtaining a response message of the target access network device and indicating that handover is agreed, the source access network device can send a mobile handover event of a terminal device to the fourth network device as soon as possible, so that the fourth network device reselects a user plane function device or an application server for the terminal device as soon as possible, so as to avoid a packet loss, frame freezing, or the like that occurs in a short period of time, improve service experience of a user, improve network resource utilization, and reduce a service switching delay.

According to an eighth aspect, an embodiment of the present invention provides a network device, where the network device is a first network device, and the first network device includes modules or units configured to perform the mobile handover method described in the first aspect.

According to a ninth aspect, an embodiment of the present invention provides a network device, where the network device is a second network device, and the second network device includes modules or units configured to perform the mobile handover method described in the second aspect.

According to a tenth aspect, an embodiment of the present invention provides a network device, where the network device is a third network device, and the third network device includes modules or units configured to perform the mobile handover method described in the third aspect.

According to an eleventh aspect, an embodiment of the present invention provides a network device, where the network device is a fourth network device, and the fourth network device includes modules or units configured to perform the mobile handover method described in the fourth aspect.

According to a twelfth aspect, an embodiment of the present invention provides a network device, where the network device is a seventh network device, and the seventh network device includes modules or units configured to perform the mobile handover method described in the fifth aspect.

According to a thirteenth aspect, an embodiment of the present invention provides another network device, where the network device is a first network device, and the first network device includes a processor, a transceiver, and a memory. The processor is configured to invoke mobile handover program code stored in the memory, to perform the mobile handover method provided in the first aspect.

According to a fourteenth aspect, an embodiment of the present invention provides another network device, where the network device is a second network device, and the second network device includes a processor, a transceiver, and a memory. The processor is configured to invoke mobile handover program code stored in the memory, to perform the mobile handover method provided in the second aspect.

According to a fifteenth aspect, an embodiment of the present invention provides another network device, where the network device is a third network device, and the third network device includes a processor, a transceiver, and a memory. The processor is configured to invoke mobile handover program code stored in the memory, to perform the mobile handover method provided in the third aspect.

According to a sixteenth aspect, an embodiment of the present invention provides another network device, where the network device is a fourth network device, and the fourth network device includes a processor, a transceiver, and a memory. The processor is configured to invoke mobile handover program code stored in the memory, to perform the mobile handover method provided in the fourth aspect.

According to a seventeenth aspect, an embodiment of the present invention provides another network device, where the network device is a seventh network device, and the seventh network device includes a processor, a transceiver, and a memory. The processor is configured to invoke mobile handover program code stored in the memory, to perform the mobile handover method provided in the fifth aspect.

According to an eighteenth aspect, an embodiment of the present invention provides a communications system, including a first network device, a second network device, and a third network device. The first network device is the first network device according to the eighth aspect or the thirteenth aspect, the second network device is the second network device according to the ninth aspect or the fourteenth aspect, and the third network device is the application server according to the tenth aspect or the fifteenth aspect.

According to a nineteenth aspect, an embodiment of the present invention provides a communications system, including a fourth network device and a seventh network device. The fourth network device is the fourth network device according to the eleventh aspect or the sixteenth aspect, and the seventh network device is the seventh network device according to the twelfth aspect or the seventeenth aspect.

According to a twentieth aspect, an embodiment of the present invention provides a computer storage medium, configured to store a computer software program instruction used by the first network device according to the first aspect. When the program instruction is executed by the first network device, the first network device is enabled to perform the method according to the first aspect.

According to a twenty-first aspect, an embodiment of the present invention provides a computer storage medium, configured to store a computer software program instruction used by the second network device according to the second aspect. When the program instruction is executed by the second network device, the second network device is enabled to perform the method according to the second aspect.

According to a twenty-second aspect, an embodiment of the present invention provides a computer storage medium, configured to store a computer software program instruction used by the third network device according to the third aspect. When the program instruction is executed by the third network device, the third network device is enabled to perform the method according to the third aspect.

According to a twenty-third aspect, an embodiment of the present invention provides a computer storage medium, configured to store a computer software program instruction used by the fourth network device according to the fourth aspect. When the program instruction is executed by the fourth network device, the fourth network device is enabled to perform the method according to the fourth aspect.

According to a twenty-fourth aspect, an embodiment of the present invention provides a computer storage medium, configured to store a computer software program instruction used by the seventh network device according to the fifth aspect. When the program instruction is executed by the seventh network device, the seventh network device is enabled to perform the method according to the fifth aspect.

According to a twenty-fifth aspect, an embodiment of the present invention provides a computer program, where the program includes a computer software program instruction. When the program instruction is executed by the first network device, the first network device is enabled to perform the method according to the first aspect.

According to a twenty-sixth aspect, an embodiment of the present invention provides a computer program, where the program includes a computer software program instruction. When the program instruction is executed by the second network device, the second network device is enabled to perform the method according to the second aspect.

According to a twenty-seventh aspect, an embodiment of the present invention provides a computer program, where the program includes a computer software program instruction. When the program instruction is executed by the third network device, the third network device is enabled to perform the method according to the third aspect.

According to a twenty-eighth aspect, an embodiment of the present invention provides a computer program, where the program includes a computer software program instruction. When the program instruction is executed by the fourth network device, the fourth network device is enabled to perform the method according to the fourth aspect.

According to a twenty-ninth aspect, an embodiment of the present invention provides a computer program, where the program includes a computer software program instruction. When the program instruction is executed by the seventh network device, the seventh network device is enabled to perform the method according to the fifth aspect.

BRIEF DESCRIPTION OF THE DRAWINGS

To describe technical solutions in embodiments of this application or in the background clearer, the following briefly describes the accompanying drawings for describing the embodiments of this application or the background.

FIG. 6A-1 and FIG. 6A-2 are a schematic flowchart of a handover process according to an embodiment of the present invention;

DETAILED DESCRIPTION OF ILLUSTRATIVE EMBODIMENTS

Terms used in implementations of this application are only used to explain specific embodiments of this application, but are not intended to limit this application.

Figure 1:
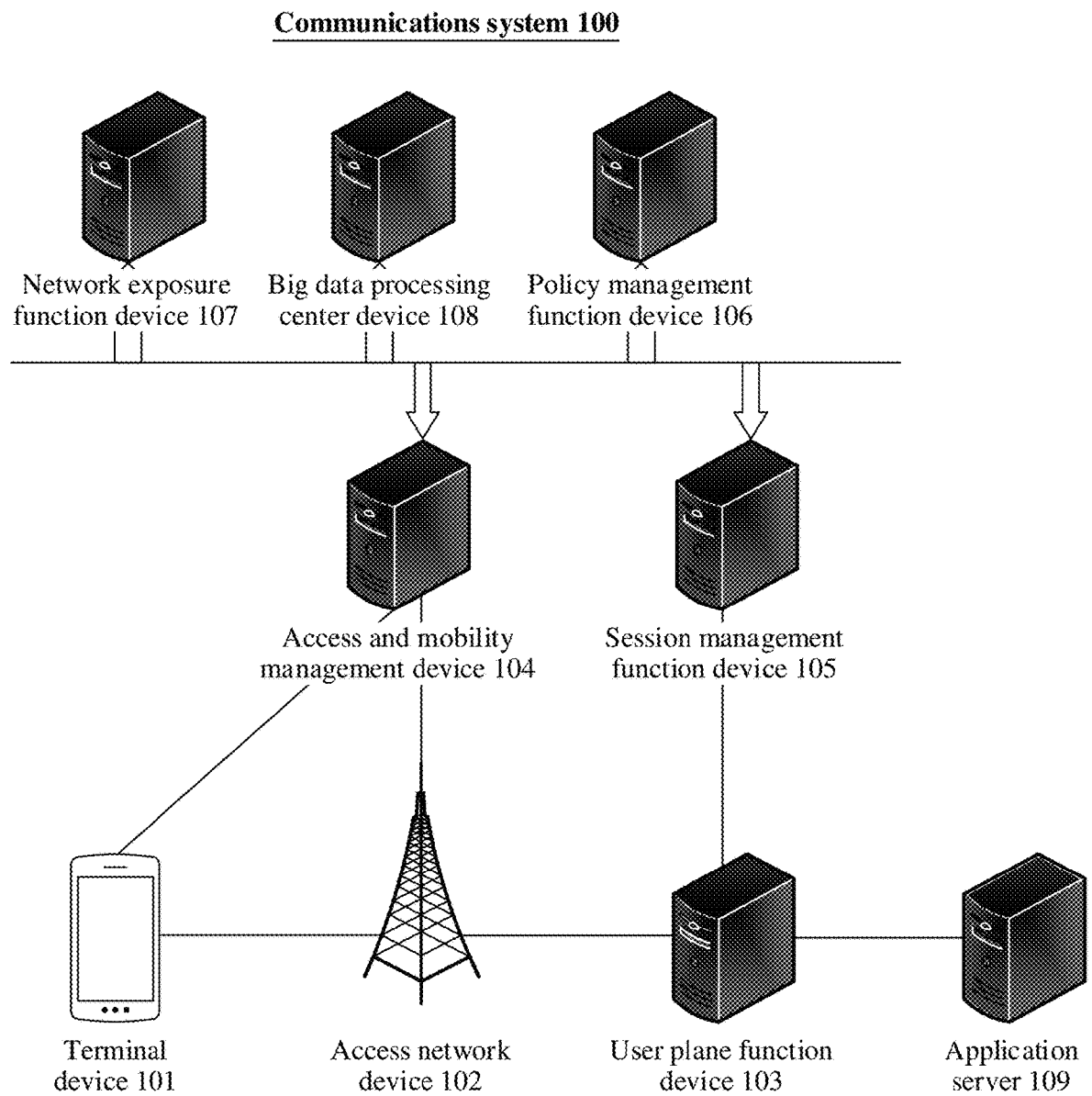
FIG. 1 is an architectural diagram of a communications system according to an embodiment of the present invention.

FIG. 1 is an architectural diagram of a communications system according to an embodiment of the present invention. A communications system 100 is not limited to a long term evolution (LTE) system, and may further be a future evolved 5G system, a new radio (NR) system, or the like. As shown in FIG. 1, the communications system 100 includes a terminal device 101, an access network (AN) device 102, a user plane function (UPF) device 103, an access and mobility management function (AMF) device 104, a session management function (SMF) device 105, a policy control function (PCF) device 106, a network exposure function (NEF) device 107, a network data analytics function (NWDA) device 108, and an application server (AS) 109.

The terminal device 101 may also be referred to as user equipment (UE). The terminal device 101 may be a device using a subscriber identity module (SIM) card, or may be a device using a non-SIM card, or a device using an embedded SIM (eSIM) card. The terminal device 101 may be distributed in the entire communications system 100, and may be static or mobile. In this embodiment of this application, the terminal device 101 may include a mobile device, a mobile station, a mobile unit, a radio unit, a remote unit, a user agent, a mobile client, and the like.

The access network device 102 may include a base transceiver station, a radio transceiver, a basic service set (BSS), an extended service set (ESS), a NodeB, an evolved NodeB (eNB or eNodeB), a next generation node (gNB), or the like. The communications system 100 may include several access network devices 102 of different types, for example, a macro base station and a micro base station. The access network device 102 may use different wireless technologies, for example, a cell radio access technology or a WLAN radio access technology.

Functions of the user plane function device 103 include but are not limited to functions such as data packet routing, filtering, and forwarding. The user plane function device 103 sends user data from the terminal device 101 to another device, and may further send data from the another device to the terminal device 101. The another device includes but is not limited to an application server and a packet data network (PDN).

The access and mobility management function device 104 is responsible for access authentication and mobility management functions of the terminal device 102.

The session management function device 105 is responsible for managing a session of the terminal device 102.

The policy control function device 106 is configured to perform policy management.

The network exposure function device 107 is a network capability exposure platform, provides an interface for a third party to provide a service, and performs centralized scheduling and management.

The network data analytics function device 108 is configured to analyze and process a monitoring data flow.

The application server 109 is configured to provide an application service for the terminal device 101.

Figure 2:
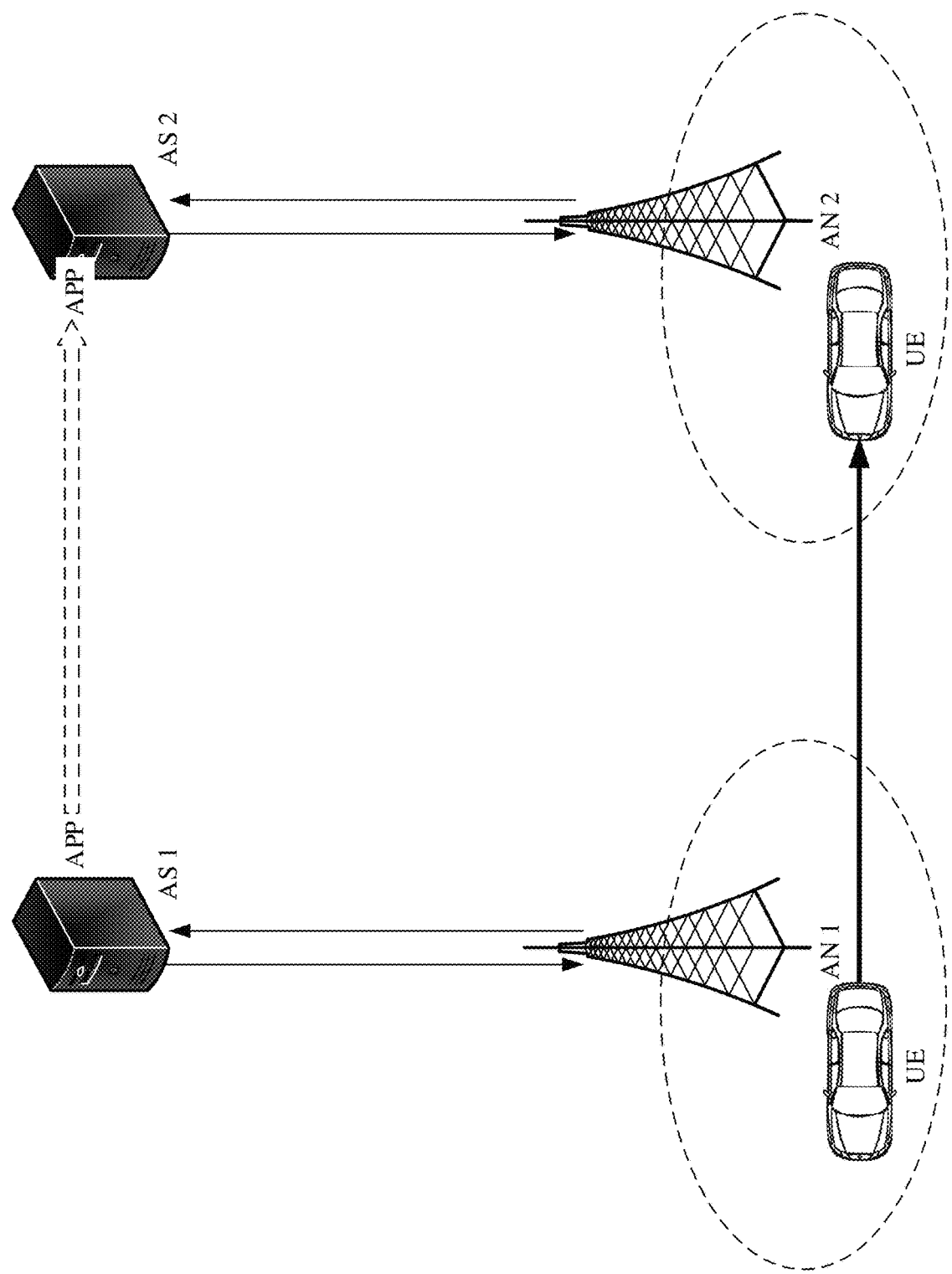
FIG. 2 is a schematic diagram of a mobile handover scenario of a terminal device according to an embodiment of the present invention.

FIG. 2 is a schematic diagram of a mobile handover scenario of a terminal device according to an embodiment of the present invention. As shown in FIG. 2, when UE is in coverage of a base station AN 1, an AS 1 may provide a service for the UE. When the UE moves from the coverage of the AN 1 to coverage of an AN 2, if quality of service can be ensured and service experience of the UE is not affected, the UE can still obtain the service from the AS 1. If quality of service cannot be ensured and service experience of the UE is affected, an application service APP migrates from the AS 1 to the AS 2. In this case, the UE obtains a service from the AS 2. Mobile handover of the UE may cause a change in a user plane function.

This embodiment of the present invention is applicable to, but not limited to, a mobile edge computing (MEC) scenario. In the MEC scenario, MEC platform serves as a service provider, UE is a service user, and the MEC platform provides a service for the UE.

To overcome impact caused by congestion and mobile handover at a transport layer, corresponding processing methods are deployed at an application layer to alleviate these problems. However, how the application layer prepares for a mobile handover event in advance is a key step for ensuring service experience of a user. To resolve the foregoing problems, this application proposes a service continuity assurance method for preparing for mobile handover of the UE in advance based on coordination between a network layer and the application layer. The mobile handover event is detected at the network layer, and the application layer is instructed in advance to prepare for base station handover, UPF handover, and application server handover, so as to avoid a packet loss, frame freezing, or the like in a short period of time in a process of the mobile handover of the UE. The application layer makes preparations in advance to resolve problems such as premature handover, delayed handover, and an incorrect handover object. In addition, the method adapts to dynamic changes of a network, for example, a moving trend of the UE. The method is sensitive to movement of the UE, and the mobile handover of the UE can be quickly responded to in the method, so that flexibility is high, and redundant occupation of network resources is reduced.

Figure 3:
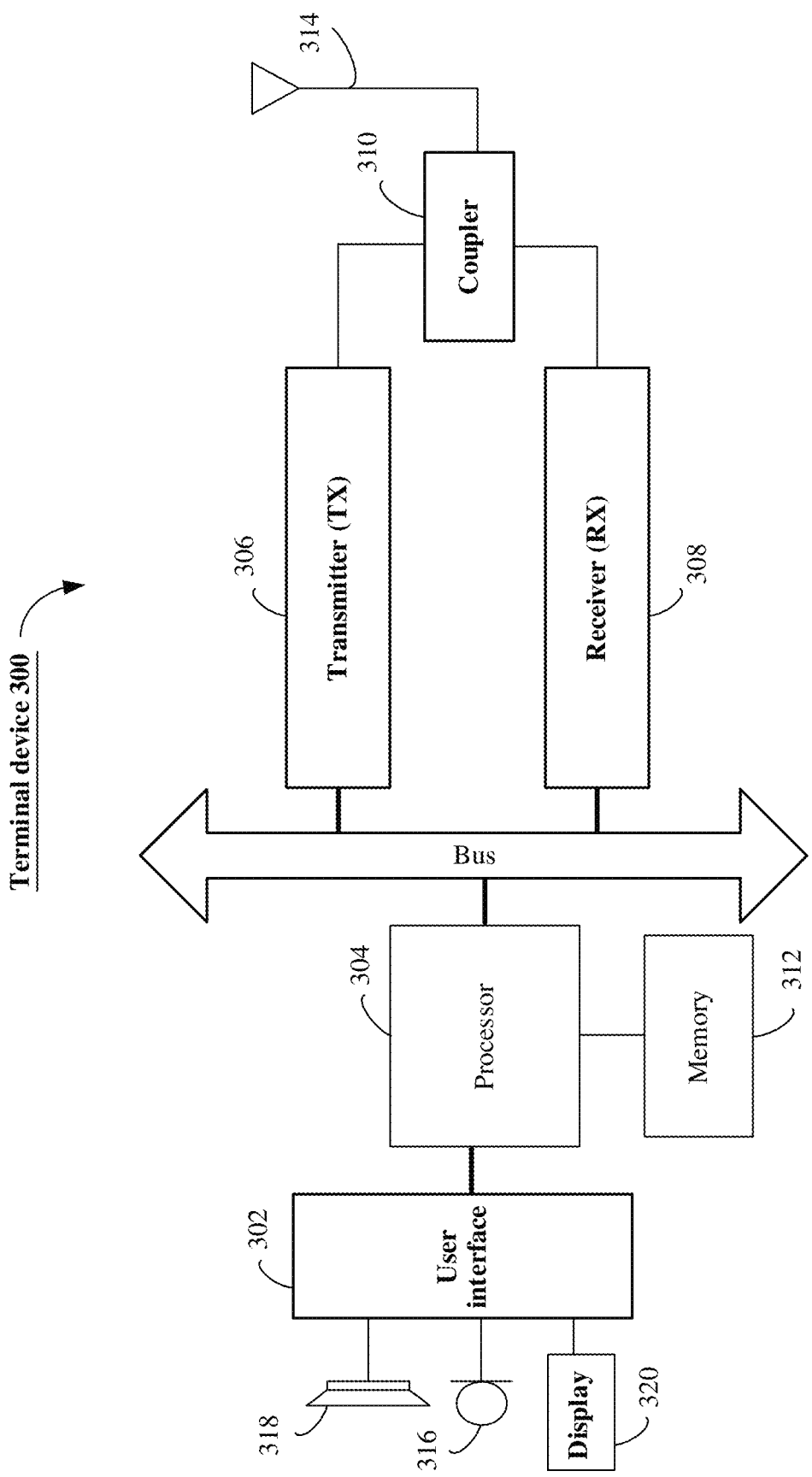
FIG. 3 is a schematic structural diagram of a terminal device according to an embodiment of the present invention.

FIG. 3 shows a terminal device according to an embodiment of the present invention. As shown in FIG. 3, a terminal device 300 may include input/output modules (including an audio input/output module 318, a key input module 316, a display 320, and the like), a user interface 302, one or more processors 304, a transmitter 306, a receiver 308, a coupler 310, an antenna 314, and a memory 312. These components may be connected by using a bus or in another manner. In FIG. 3, an example in which the components are connected by using a bus is used.

The antenna 314 may be configured to convert electromagnetic energy into an electromagnetic wave in free space, or convert an electromagnetic wave in free space into electromagnetic energy in a transmission line. The coupler 310 is configured to divide a mobile communication signal received by the antenna 314 into a plurality of signals, and allocate the plurality of signals to a plurality of receivers 308.

The transmitter 306 may be configured to perform transmission processing on a signal output by the processor 304.

The receiver 308 may be configured to perform receiving processing on the mobile communication signal received by the antenna 314.

In this embodiment of this application, the transmitter 306 and the receiver 308 may be considered as a wireless modem. In the terminal device 300, there may be one or more transmitters 306 and receivers 308.

In addition to the transmitter 306 and the receiver 308 shown in FIG. 3, the terminal device 300 may further include another communications component, for example, a GPS module, a Bluetooth module, or a wireless fidelity (Wi-Fi) module. In addition to the foregoing wireless communication signal, the terminal device 300 may further support another wireless communication signal, for example, a satellite signal or a short-wave signal. Not limited to wireless communication, the terminal device 300 may be further configured with a wired network interface (for example, a LAN interface) 301 to support wired communication.

The input/output modules may be configured to implement interaction between the terminal device 300 and a user or an external environment, and may mainly include the audio input/output module 318, the key input module 316, the display 320, and the like. Specifically, the input/output modules may further include a camera, a touchscreen, a sensor, and the like. The input/output modules all communicate with the processor 304 through the user interface 302.

The memory 312 may be coupled to the processor 304 by using the bus or an input/output port, or the memory 312 may be integrated with the processor 304. The memory 312 is configured to store various software programs and/or a plurality of groups of instructions. Specifically, the memory 312 may include a high-speed random access memory, and may also include a non-volatile memory, for example, one or more magnetic disk storage devices, a flash memory device, or another non-volatile solid-state storage device. The memory 312 may store an operating system (which is briefly referred to as a system below), for example, an embedded operating system such as Android, iOS, Windows, or Linux. The memory 312 may further store a network communications program. The network communications program may be used to communicate with one or more additional devices, one or more terminal devices, and one or more network devices. The memory 312 may further store a user interface program. The user interface program may use a graphical operation interface to vividly display content of an application program, and use input controls such as menus, dialog boxes, and keys to receive control operations of a user on the application program.

In this embodiment of this application, the memory 312 may be configured to store an implementation program, on a terminal device 300 side, of a mobile handover method provided in one or more embodiments of this application. For implementation of the mobile handover method provided in the one or more embodiments of this application, refer to subsequent embodiments.

The processor 304 may be configured to read and execute a computer-readable instruction. Specifically, the processor 304 may be configured to invoke a program stored in the memory 312, for example, the implementation program, on the terminal device 300 side, of the mobile handover method provided in the one or more embodiments of this application, and execute an instruction included in the program to implement the method in the subsequent embodiments. The processor 304 may support one or more of global system for mobile communications (GSM)(2G) communication, wideband code division multiple access (WCDMA)(3G) communication, long term evolution (LTE)(4G) communication, 5G communication, and the like. Optionally, the processor 304 specifically drives or controls the transmitter 306 to send any message or data. Optionally, the processor 304 specifically drives or controls the receiver 308 to receive any message or data. Therefore, the processor 304 may be considered as a control center for performing sending or receiving, and the transmitter 306 and the receiver 308 are specific executors of sending and receiving operations.

It can be understood that the terminal device 300 may be the terminal device 101 in the communications system 100 shown in FIG. 1, and may be implemented as a mobile device, a mobile station, a mobile unit, a radio unit, a remote unit, a user agent, a mobile client, or the like.

It should be noted that the terminal device 300 shown in FIG. 3 is merely an implementation of this embodiment of this application, and in actual application, the terminal device 300 may further include more or fewer components. This is not limited herein.

Figure 4:
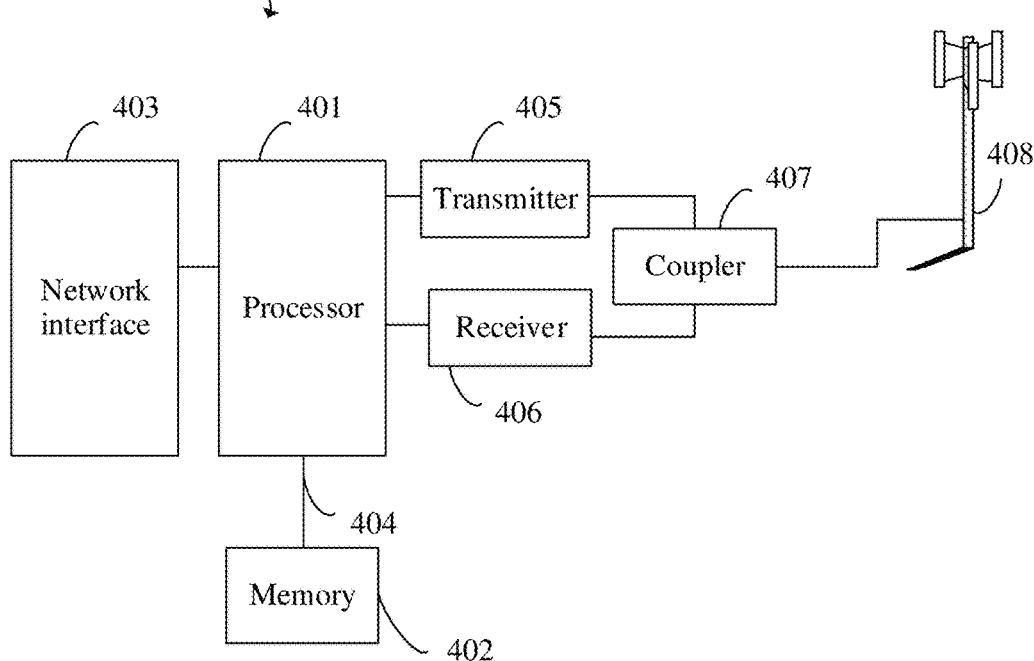
FIG. 4 is a schematic structural diagram of an access network device according to an embodiment of the present invention.

FIG. 4 shows an access network device according to an embodiment of the present invention. As shown in FIG. 4, an access network device 400 may include one or more processors 401, a memory 402, a network interface 403, a transmitter 405, a receiver 406, a coupler 407, and an antenna 408. These components may be connected by using a bus 404 or in another manner. In FIG. 4, an example in which the components are connected by using a bus is used.

The network interface 403 may be used by the network device 400 for communicating with another communications device, for example, another network device. Specifically, the network interface 403 may be a wired interface.

The transmitter 405 may be configured to perform transmission processing, for example, signal modulation, on a signal output by the processor 401. The receiver 406 may be configured to perform reception processing, for example, signal demodulation, on a mobile communication signal received by the antenna 408. In some embodiments of this application, the transmitter 405 and the receiver 406 may be considered as a wireless modem. In the network device 400, there may be one or more transmitters 405 and receivers 406. The antenna 408 may be configured to convert electromagnetic energy in a transmission line into an electromagnetic wave in free space, or convert an electromagnetic wave in free space into electromagnetic energy in a transmission line. The coupler 407 may be configured to divide the mobile communication signal into a plurality of signals, and allocate the plurality of signals to a plurality of receivers 406.

The memory 402 may be coupled to the processor 401 by using the bus 404 or an input/output port, or the memory 402 may be integrated with the processor 401. The memory 402 is configured to store various software programs and/or a plurality of groups of instructions. Specifically, the memory 402 may include a high-speed random access memory, and may also include a non-volatile memory, for example, one or more magnetic disk storage devices, a flash memory device, or another non-volatile solid-state storage device. The memory 402 may store an operating system (which is briefly referred to as a system below), for example, an embedded operating system such as uCOS, VxWorks, or RTLinux. The memory 402 may further store a network communications program. The network communications program may be used to communicate with one or more additional devices, one or more terminal devices, and one or more network devices.

The processor 401 may be configured to: manage a radio channel, establish and disconnect a call link and a communications link, and provide cell handover control and the like for a user in a local control area. Specifically, the processor 401 may include: an administration module/communication module (AM/CM) (which is used in a center of speech channel interaction and information exchange), a basic module (BM) (configured to complete call processing, signaling processing, radio resource management, radio link management, and circuit maintenance functions), a transcoder and submultiplexer (TCSM) unit (configured to complete multiplexing/demultiplexing and transcoder functions), and the like.

In this embodiment of this application, the processor 401 may be configured to read and execute a computer-readable instruction. Specifically, the processor 401 may be configured to: invoke a program stored in the memory 402, for example, an implementation program, on an access network device 400 side, of a mobile handover method provided in one or more embodiments of this application, and execute an instruction included in the program.

It can be understood that, the access network device 400 may be the access network device 102 in the communications system 100 shown in FIG. 1, and may be implemented as a base transceiver station, a wireless transceiver, a basic service set (BSS), an extended service set (ESS), a NodeB, an eNodeB, a gNB, or the like.

It should be noted that the access network device 400 shown in FIG. 4 is merely an implementation of this embodiment of this application, and in an actual application, the access network device 400 may further include more or fewer components. This is not limited herein.

Figure 5:
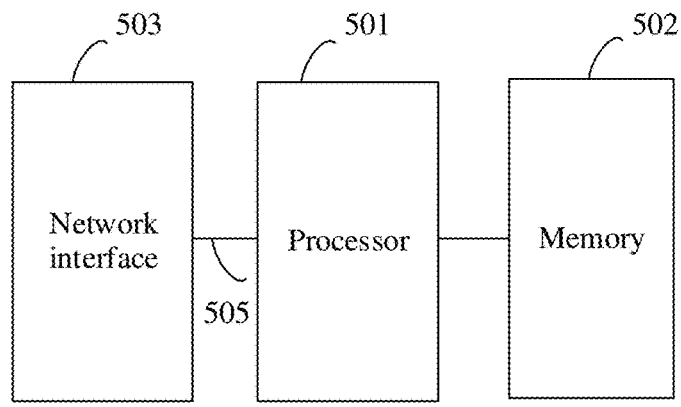
FIG. 5 is a schematic structural diagram of a network device according to an embodiment of the present invention.

FIG. 5 shows a network device according to an embodiment of the present invention. As shown in FIG. 5, a network device 500 may include one or more processors 501, a memory 502, and a network interface 503. These components may be connected by using a bus 505 or in another manner. In FIG. 5, an example in which the components are connected by using a bus is used.

The processor 501 may be referred to as a central processing unit (CPU). The processor 501 executes a computer instruction in the memory 502, to implement this embodiment of the present invention. In addition, to save computing resources of the processor 501, a field programmable gate array (FPGA) or another hardware may also be configured to perform all operations of the processor 501 in this embodiment of the present invention, or an FPGA or another hardware and the processor 501 are separately configured to perform operations of the processor 501 in this embodiment of the present invention. The processor communicates with the communications interface 503. The communications interface 503 may be a network interface card (NIC), a host bus adapter (HBA), or the like.

The memory 502 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 502 is not limited thereto. The memory may exist independently, and is connected to the processor by using the bus. Alternatively, the memory may be integrated with the processor.

The network interface 503 may be used by the network device 500 for communicating with another communications device, for example, another network device. Specifically, the network interface 503 may be a wired interface.

The communications bus 505 may include a channel, and transmits information between the foregoing components. The communications interface 503 is configured to communicate with another device or a communications network, such as the Ethernet, a radio access network (RAN), or a wireless local area network (WLAN) via any apparatus such as a transceiver.

In this embodiment of this application, the processor 501 may be configured to read and execute a computer-readable instruction. Specifically, the processor 501 may be configured to: invoke a program stored in the memory 502, for example, an implementation program, on a network device 500 side, of mobile handover method provided in one or more embodiments of this application, and execute an instruction included in the program.

It may be understood that, for the user plane function device 103, the access and mobility management function device 104, the session management function device 105, the policy control function device 106, the network exposure function device 107, the network data analytics function device 108, or the application server 109 in the communications system 100 shown in FIG. 1, refer to a structure of the network device 500 shown in FIG. 5.

It should be noted that the network device 500 shown in FIG. 5 is merely an implementation of this embodiment of this application, and in actual application, the network device 500 may further include more or fewer components. This is not limited herein.

Figure 6:
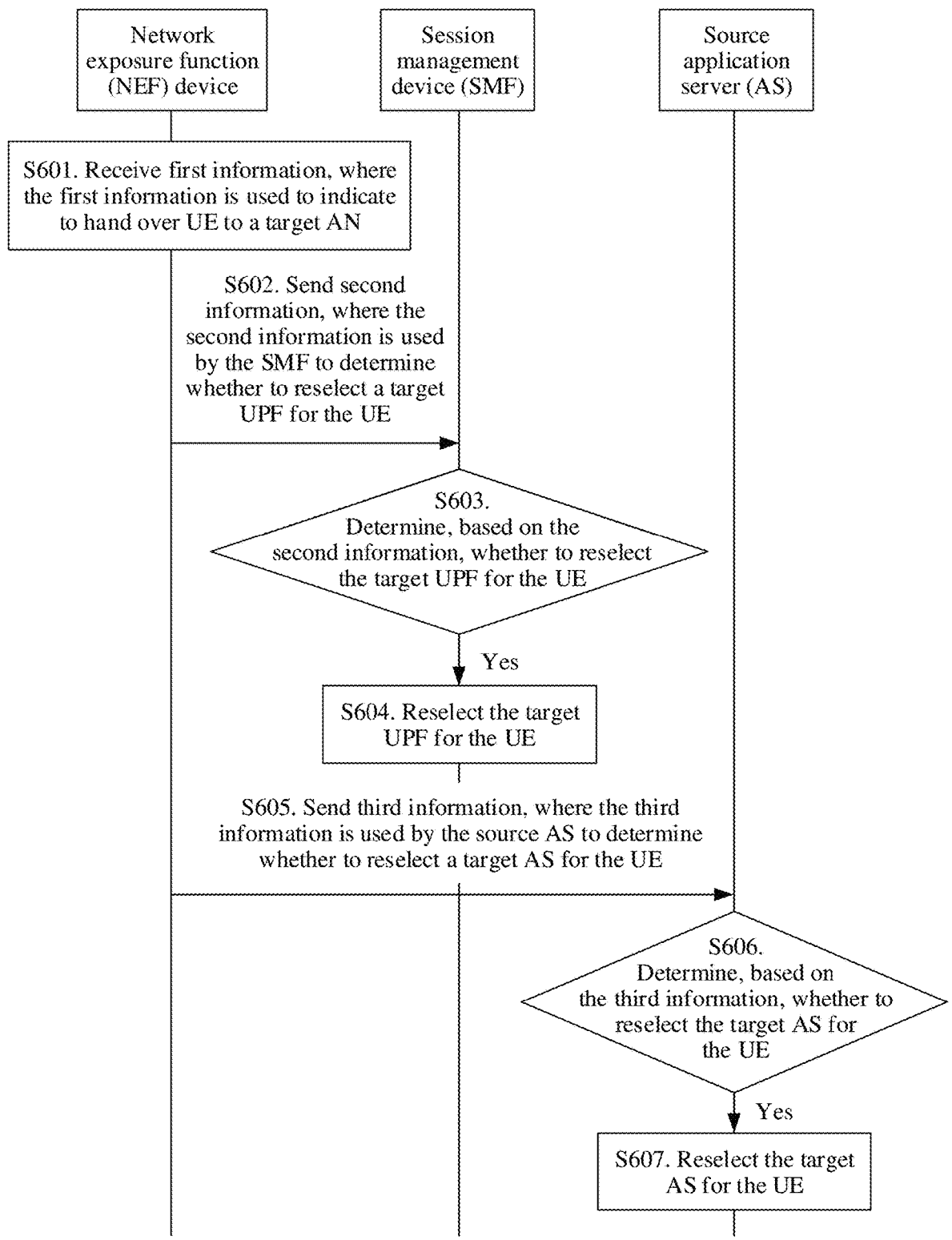
FIG. 6 is a schematic flowchart of a mobile handover method according to an embodiment of the present invention.

Based on the embodiments corresponding to the communications system 100, the terminal device 300, the access network device 400, and the network device 500, an embodiment of the present invention provides a mobile handover method. FIG. 6 is a schematic flowchart of a mobile handover method according to Embodiment 1 of the present invention. In this embodiment of the present invention, an example in which a first network device is an NEF, a second network device is an SMF, and a third network device is a source AS is used for description. The first network device, the second network device, or the third network device may be another device that has a corresponding function. The mobile handover method includes but is not limited to the following steps.

S601. The NEF receives first information, where the first information indicates handover of UE to a target AN.

Optionally, the first information may be a specific message, and the message may indicate handover of the UE from a source AN to the target AN. For example, the message includes at least one of an identifier of the UE, an identifier of the source AN, or an identifier of the target AN. Alternatively, the first information may be a field carried in a message, and the field is used to indicate handover of the UE from a source AN to the target AN.

Optionally, a manner in which the NEF obtains a mobile handover event of the UE may be as follows: The NEF subscribes to the mobile handover event of the UE from the source AN via an AMF, and the source AN reports the mobile handover event to the NEF in a handover preparation phase. For example, the source AN sends the first information to the NEF, where the first information indicates handover of the UE from the source AN to the target AN. The first information may carry the identifier of the UE and the identifier of the target AN. Optionally, the first information may further carry the identifier of the source AN. Alternatively, the first information may carry the identifier of the UE and handover indication information. In a communications network, a handover process is divided into the handover preparation phase, a handover execution phase, and a handover completion phase. The mobile handover event indicates that the UE is about to be handed over from the source AN to the target AN in a UE movement process. A specific process occurs in the handover preparation phase or the handover execution phase. A specific process is as follows: In the UE movement process, the UE communicates with the source AN, and the source AN monitors movement of the UE in real time, monitors a location distance between the UE and the source AN, or monitors strength of a communications signal between the UE and the source AN. When a handover condition is met (for example, quality of the communications signal between the UE and the source AN is lower than a preset threshold), the source AN makes a handover decision. The source AN sends a handover request to the target AN. The target AN controls and manages whether handover can be performed on the source AN. If the handover can be performed on the source AN, the target AN sends a handover response (which is also referred to as a handover response message) to the source AN. After receiving the response indicating that the target AN agrees to the handover request, the source AN sends the first information to the NEF in a timely manner. This is different from the conventional technology. In the conventional technology, after handover execution is completed, a target access network device sends a message to the AMF, and the core network device AMF determines, based on the message, that the UE is handed over. Then, the AMF sends a message to the SMF, to update a user plane channel. In a process of updating the user plane channel, a case such as network device reselection may occur. Consequently, application server reselection may occur. If the application server reselection occurs in this case, a phenomenon such as service interruption may occur.

Figures 1, 6A:
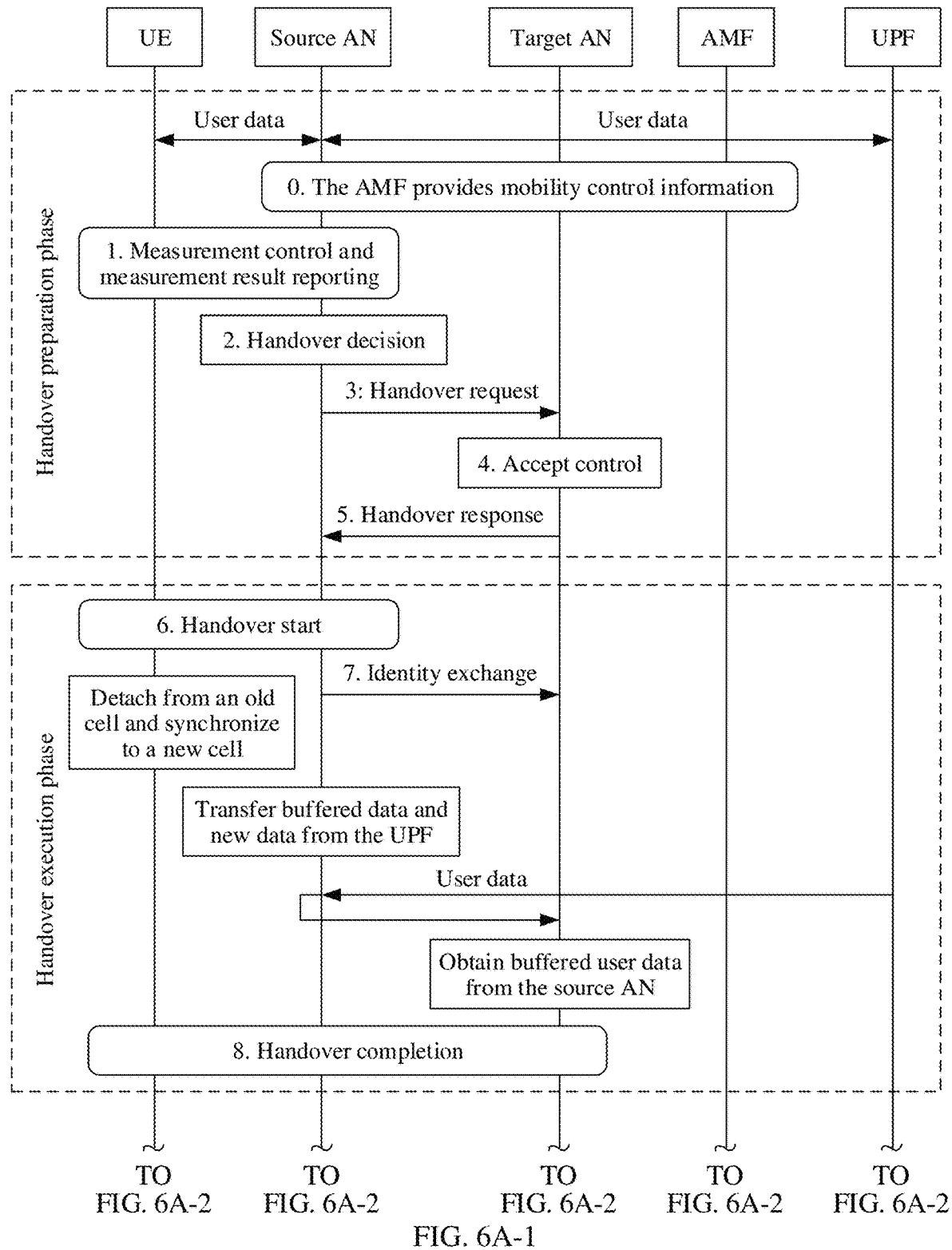
Figures 2, 6A:
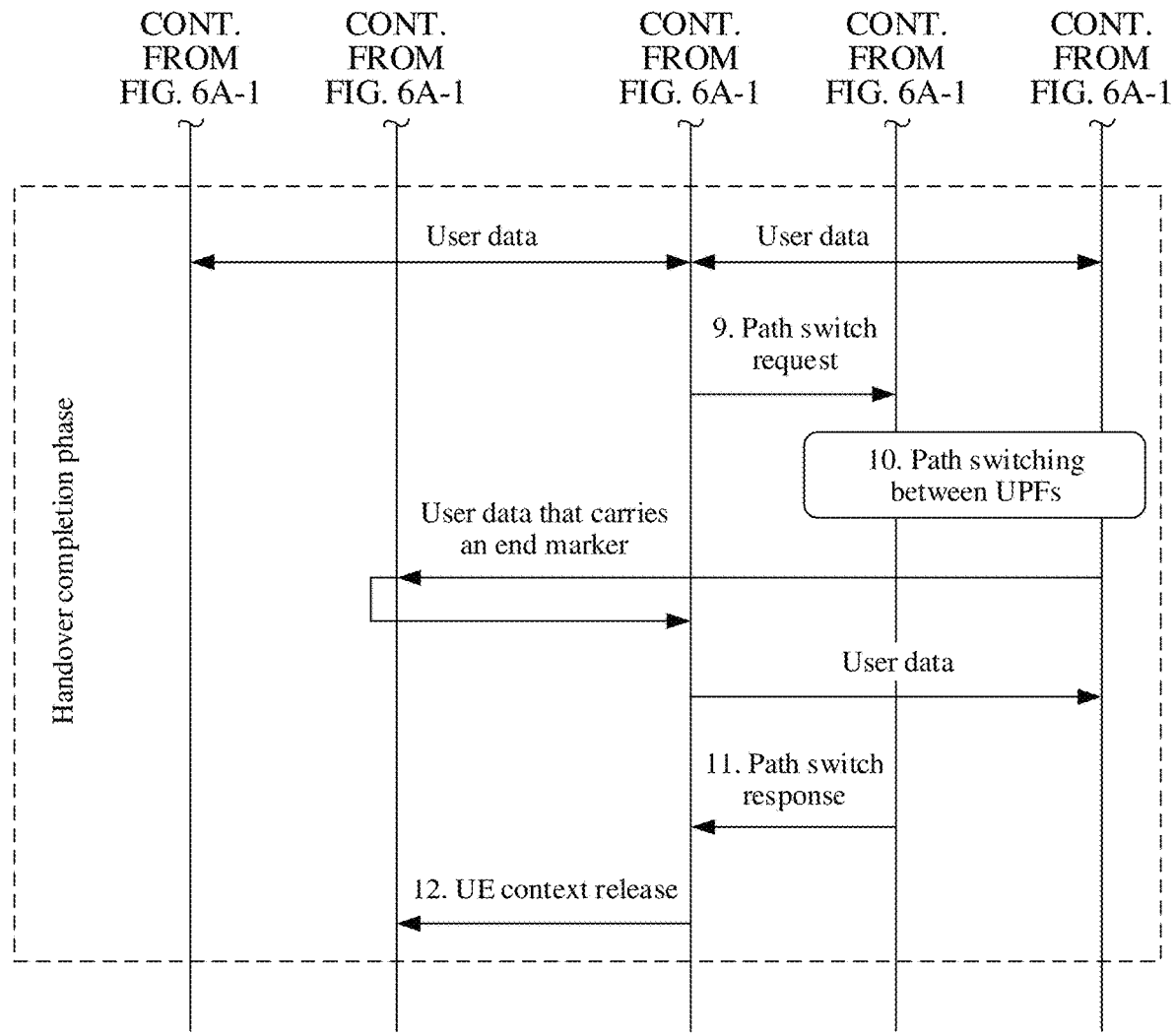

FIG. 6A-1 and FIG. 6A-2 are a schematic flowchart of a handover process according to this application. As shown in FIG. 6A-1 and FIG. 6A-2, a handover process of the UE includes three phases: handover preparation, handover execution, and handover completion. In the conventional technology, the core network device learns of a handover event of the UE in the handover completion phase. In step 9 in FIG. 6A-1 and FIG. 6A-2, the target access network device sends the message to the AMF. In this case, a network side device can learn of handover of the UE and perform subsequent processes. To be specific, the core network device AMF determines, based on the message, that the UE is handed over, and the AMF sends the message to the SMF to update the user plane channel. However, in this application, the core network device can learn of the handover event of the UE in the handover preparation phase or the handover execution phase. Specifically, after receiving the handover response (namely, step 5 shown in FIG. 6A-1 and FIG. 6A-2) sent by the target AN, the source AN may notify the NEF that the UE is to be handed over, and may further trigger the NEF to perform subsequent processes (for example, step S602 and step S605 in this application). Therefore, a core network device can also learn of the mobile handover event of the UE, and does not need to wait for a subsequent handover complete process to learn of the handover event of the UE. Therefore, compared with the conventional technology, in this application, the core network device can learn of the mobile handover event of the UE as early as possible and in a more timely manner, so as to prepare for the mobile handover event of the UE in a timely manner in advance. In addition, a specific step, in a handover preparation process or a handover execution process, in which the source AN notifies the NEF of the mobile handover event of the UE is not limited in this application. For example, the source AN may notify the NEF of the mobile handover event of the UE after step 5 in the handover preparation phase, or may notify the NEF of the mobile handover event of the UE in a step in the handover execution phase.

S602. The NEF sends second information to the SMF, where the second information is used by the SMF to determine whether to reselect a target UPF for the UE.

The second information may include the identifier of the UE, and optionally, may further include at least one of the following: a UE handover indication, the identifier of the target AN, location information of the UE, or the like.

Optionally, the NEF may send the second information to the SMF device via the AMF device. A message sent by the NEF to the AMF may be referred to as sixth information, and a message sent by the AMF to the SMF may be referred to as the second information. The second information and the sixth information may be the same, or may be different.

S603. The SMF receives the second information sent by the NEF, determines, based on the second information, whether to reselect the target UPF for the UE, and performs step S604 if determining that the target UPF needs to be reselected for the UE.

S604. The SMF reselects the target UPF for the UE.

After receiving the first information sent by the source AN, the NEF may report, to the SMF, that the mobile handover event occurs on the UE, so that the SMF determines whether to reselect the UPF for the UE. For example, the NEF sends the second information to the SMF, where the second information includes the identifier of the UE. Optionally, the second information may further include at least one of the following: the UE handover indication, the identifier of the target AN, the location information of the UE, and the like. The SMF obtains network deployment information in advance. After receiving the second information sent by the NEF, the SMF determines, based on location information of the target AN and/or the location information of the UE, whether the UPF needs to be reselected for the UE. If the SMF determines, based on a location information of the target AN and/or the location information of the UE and a current location of a source UPF, that the current location of the source UPF is better, the UPF does not need to be reselected. If the current location of the source UPF is improper (quality of service is lower than a threshold), the UPF needs to be reselected. Specifically, how the SMF device determines whether the UPF is reselected is not limited. If determining that the UPF needs to be reselected, the SMF reselects the target UPF for the UE based on the location information of the target AN and/or the location information of the UE. Optionally, the second information may further include an identifier of a target AS. The target AS is a reselected AS that provides an application service for the UE. The SMF determines, based on location information of the target AS, whether the UPF needs to be reselected for the UE. Each AS may be configured with one or more UPFs. When the target AS changes, the SMF needs to determine whether the UPF needs to be changed. If the SMF determines, based on a location information of the target AS and a current location of a source UPF, that the current location of the source UPF is better, the UPF does not need to be reselected. If a current location of a source UPF is improper (quality of service is lower than a threshold), the UPF needs to be reselected. If the SMF determines that the UPF needs to be reselected, the SMF reselects the target UPF for the UE based on the location information of the target AS. The SMF may further determine, based on the target AN and the target AS, whether to reselect the target UPF for the UE. If the SMF determines that the target UPF needs to be reselected, the SMF reselects the target UPF for the UE based on the target AN and the target AS.

Optionally, after determining the target UPF, the SMF may further send information about the target UPF to the NEF. The NEF receives the information about the target UPF sent by the SMF, and sends the information about the target UPF to the source AS. The source AS receives the information about the target UPF sent by the NEF, and determines, based on current quality of service (QoS) of the UE, location information of the target UPF, or the location information of the target AN, whether to reselect the target AS for the UE. In addition, when reselecting the target AS for the UE, the source AS may reselect the target AS for the UE based on the quality of service, the location information of the target UPF, or the location information of the target AN. Herein, the information about the target UPF includes an identifier of the target UPF and/or a data network access identifier (DNAI) corresponding to the target UPF.

S605. The NEF sends third information to the source AS, where the third information is used by the source AS to determine whether to reselect the target AS for the UE.

S606. The source AS receives the third information sent by the NEF, determines, based on the third information, whether to reselect the target AS for the UE, and performs step S607 if determining that the target AS needs to be reselected for the UE.

S607. The source AS reselects the target AS for the UE.

It should be noted that a sequence of performing step S602 and step S605 is not limited, and only one of step S602 and step S605 may be performed, or both of the two steps may be performed.

After obtaining the first information, the NEF may further notify the source AS that the mobile handover event occurs on the UE, so as to instruct the source AS to determine whether to reselect the AS for the UE. For example, the NEF sends the third information to the source AS, where the third information includes the identifier of the UE. Optionally, the third information may further include the identifier of the target AN and/or the location information of the UE. After receiving the third information from the NEF, the source AS determines whether to reselect the AS. For example, ANs are divided based on coverage of an AS, and coverage of each AS includes several ANs. It is assumed that the UE is handed over from an AN in coverage of one AS to an AN in coverage of another AS. In this case, the AS needs to be reselected. Alternatively, when the UE moves, the source AS determines whether the current quality of service can meet a requirement of the UE. If the current quality of service can meet the requirement of the UE, the AS does not need to be reselected. If the current quality of service cannot meet the requirement of the UE, the AS needs to be reselected. Alternatively, the source AS determines, based on the location information of the target AN, whether to reselect the target AS. Optionally, the third information may further include the information about the target UPF, and the information about the target UPF may include the identifier of the target UPF or the data network access identifier (DNAI) corresponding to the target UPF. Each UPF can be shared by one or more ASs. When the target UPF changes, it needs to be determined whether the AS needs to be changed. The source AS determines, based on a location information of the target UPF, whether to reselect the target AS. If the target AS needs to be reselected, the source AS may reselect the target AS for the UE based on the location information of the target AN or the location information of the target UPF.

Optionally, after determining the target AS, the source AS may further send information about the target AS to the NEF, and the NEF receives the information about the target AS sent by the source AS. The NEF sends the information about the target UPF to the target AS, so that the target AS determines a UPF that provides a data transmission service for a terminal device after mobile handover is performed on the terminal device. Alternatively, the source AS may send the information about the target UPF to the target AS, so that the target AS determines a UPF that provides a data transmission service for a terminal device after mobile handover is performed on the terminal device. Herein, the information about the target AS includes the identifier of the target AS and/or a data network access identifier (DNAI) corresponding to the target AS. Optionally, the SMF may further send the identifier of the target AN to the target UPF, so that the target UPF can determine an AN that provides a data transmission service for the terminal device after the mobile handover is performed on the terminal device. Alternatively, the SMF creates a tunnel from the target AN to the target UPF, and sends a tunnel identifier to the target UPF, so that the target UPF can determine an AN that provides a data transmission service for the terminal device after the mobile handover is performed on the terminal device.

Optionally, the NEF may further send the information about the target AS to the target UPF via the SMF, so that the target UPF can determine an AS that provides a data transmission service for the terminal device after the mobile handover is performed on the terminal device.

Optionally, the NEF may further send the information about the target UPF to the target AN via the AMF, so that the target AN can determine a UPF that provides a data transmission service for the terminal device after the mobile handover is performed on the terminal device.

After the source AS determines the location information of the target AS, the source AS needs to pre-deploy or migrate an application service to the target AS, so that the target AS can provide a service for the UE in a timely manner after the UE is handed over. For a specific process, refer to the following.

The source AS stores current running status information of an application program of the UE. The source AS sends an application migration request to the target AS, where the application migration request includes at least one of the application program, a current execution state (for example, a phase or progress of execution) of the application program, and a current execution result. The target AS receives the application migration request sent by the source AS, creates an application instance, and resumes the application program based on the current execution state (for example, the phase or progress of execution) of the application program and the current execution result. The target AS sends migration complete information to the source AS. The source AS receives the migration complete information sent by the target AS.

The mobile handover event of the UE causes an improper UPF location, and affects quality of service of the UE. After mobile handover occurs on the UE, if the NEF reselects a new target UPF, a new communications path needs to be established. For a specific process, refer to FIG. 7.

S701. The source AS adds a first identifier EndMarker to the last data packet sent to the UE.

S702. The source AS sends the data packet carrying the first identifier to the source UPF.

S703. The source UPF receives the data packet that is sent by the source AS and that carries the first identifier, and sends the data packet carrying the first identifier to the UE.

S704. After receiving the data packet carrying the first identifier, the source UPF enables a channel between the source UPF and the target UPF. The source UPF forwards received user data packets of the UE to the target UPF.

S705. The target UPF receives user data of the UE sent by the source UPF, and forwards the received user data packets of the UE to the target AS. Then, the target AS provides a service for the terminal device, and data of the terminal device is sent by the target AS to the terminal device via the target UPF and the target AN. After reselecting the target UPF, the NEF may send the identifier of the target UPF to the source UPF, so that the source UPF migrates the user data of the UE to the target UPF.

After the foregoing process, a communications path has been established between the UE, the target AN and/or the target UPF, and the target AS, and the target AS provides the service for the UE via the target UPF and the target AN, to ensure that the service is not interrupted.

In this embodiment of the present invention, when the mobile handover is performed on the UE, the UE may be handed over from the source AN to another AN (namely, the target AN), or may be handed over between different cells in a same AN. In this application, an example in which the UE is handed over between ANs is used for description. For a scenario in which the UE performs inter-cell handover in the same AN, the target cell may be equivalent to the target AN, and details are not described again.

In Embodiment 1, after determining that the mobile handover event occurs on the UE, the NEF instructs the SMF to determine whether to reselect the target UPF for the UE, and/or instructs the source AS to determine whether to reselect the target AS for the UE.

According to Embodiment 1, for the mobile handover event of the UE, based on coordination of the UE, a network layer, and an application layer, perception of the mobile handover event of the UE, and information about the target AN and/or identification information of the UE, the target AS and/or the target UPF are/is selected, the application service is pre-deployed to the target AS, and a handover time is determined. The NEF instructs the application layer to make preparations in advance, for example, forward the user data and configure application parameters. In this way, a packet loss, frame freezing, or the like that occurs in a short period of time can be avoided, service experience of a user is improved, network resource utilization is improved, and a service switching delay is reduced. This technology is applicable to various low-latency, location-aware, and computing-intensive application services, such as a real-time high-quality video service and a low-latency rescue emergency service.

Compared with a method based on prediction of a handover time in the conventional technology, in the method in Embodiment 1 of the present invention, the mobile handover event of the UE is detected in advance in a network, so as to instruct the application layer to make preparations in advance. Main improvements are as follows: (1) In Embodiment 1, an application service related to location navigation is not depended on, and dynamic location change information of the UE does not need to be monitored in real time. (2) In a prediction-based method in the conventional technology, there is a very high requirement on a prediction precision, and in particular, there is a relatively high requirement on a computing capability for UE moving in a fast speed. (3) In Embodiment 1, the mobile handover event of the UE is detected in advance from the network layer, and at the same time, the application layer makes related preparations in advance, so that it is unnecessary to predict a mobile handover time, so as to avoid problems such as a premature handover time, a delayed handover time, and an incorrect handover object.

Embodiment 2

Figure 8:
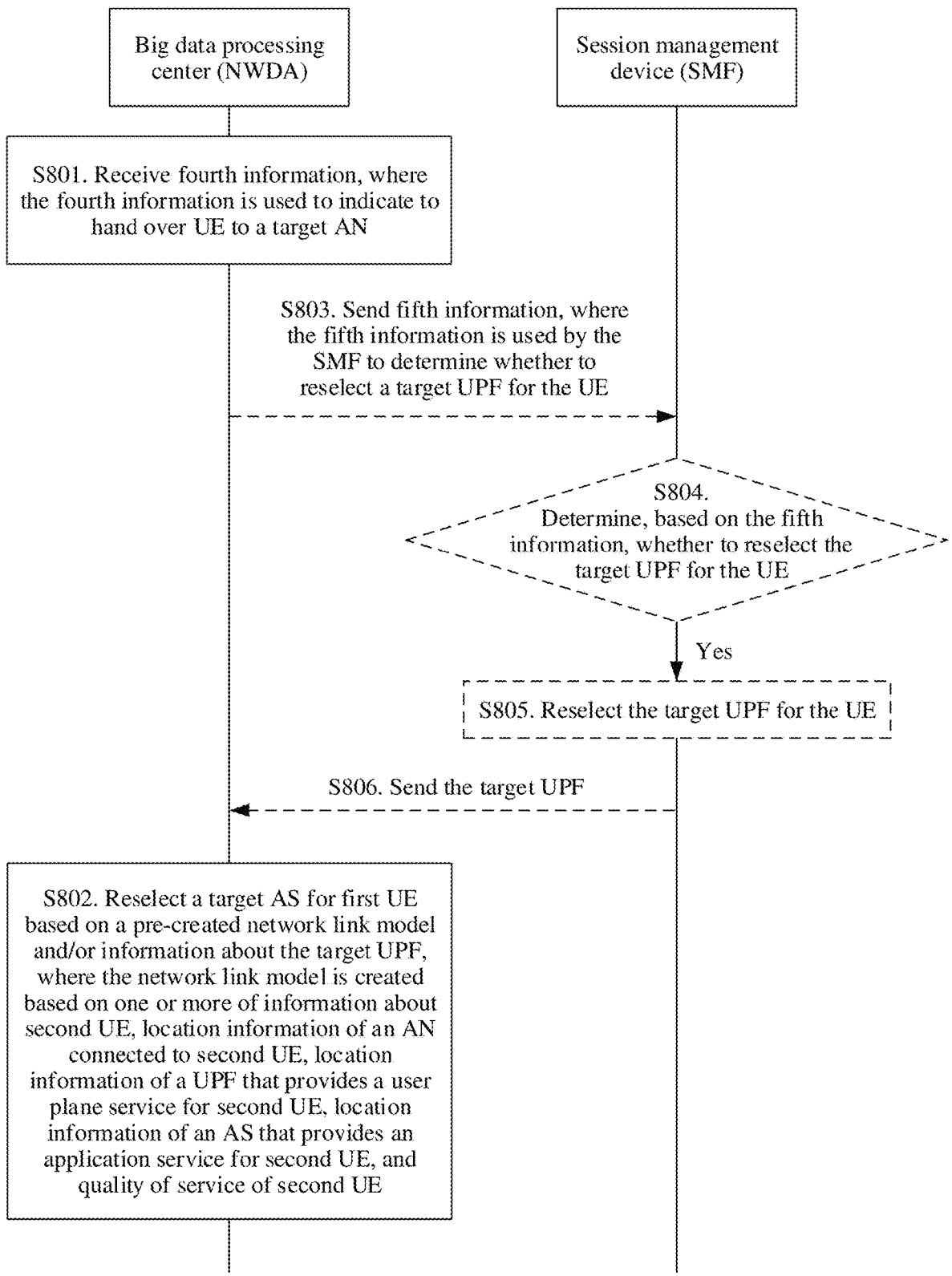
FIG. 8 is a schematic flowchart of another mobile handover method according to an embodiment of the present invention.

An embodiment of the present invention provides a mobile handover method. FIG. 8 is a schematic flowchart of a mobile handover method according to Embodiment 2 of the present invention. In this embodiment of the present invention, an example in which a fourth network device is an NWDA, a fifth network device is a target UPF, a sixth network device is a target AS, and a seventh network device is an SMF is used for description. The mobile handover method includes but is not limited to the following steps.

S801. The NWDA receives fourth information, where the fourth information indicates handover of first UE to a target AN.

A manner in which the NWDA obtains the fourth information may be as follows: The NWDA subscribes to a mobile handover event of UE from a source AN via an AMF, and the NWDA receives the fourth information sent by the source AN, where the fourth information is that the source AN reports the mobile handover event to the NWDA in a handover preparation phase. For example, after receiving a response message that indicates that the handover is agreed and that is sent by the target AN, the source AN sends the fourth information to the NWDA, where the fourth information indicates handover of the UE from the source AN to the target AN. The source AN may send the fourth information to the NWDA in the handover preparation phase or a handover execution phase. For details, refer to the description of a case in which the source AN notifies the NEF of the mobile handover event of the UE in FIG. 6A-1 and FIG. 6A-2 in the foregoing embodiment. Details are not described herein again.

Alternatively, a manner in which the NWDA obtains the fourth information may be as follows: The NWDA receives the fourth information sent by an NEF, where the fourth information is received by the NEF from a source AN. For example, after receiving a response message that indicates that the handover is agreed and that is sent by the target AN, the source AN sends mobile handover information to the NEF, where the mobile handover information indicates handover of the UE from the source AN to the target AN. After receiving the mobile handover information sent by the source AN, the NEF sends the fourth information to the NWDA.

Optionally, the fourth information may be a specific message, and the message may indicate handover of the UE from the source AN to the target AN. For example, the message includes at least one of an identifier of the UE, an identifier of the source AN or an identifier of the target AN, and location information of the UE. Optionally, the message may further include indication information indicating that AN handover occurs for the UE. Alternatively, the fourth information may be a field carried in a message, and the field is used to indicate handover of the UE from the source AN to the target AN. For example, the field includes at least one of an identifier of the UE, an identifier of the source AN, or an identifier of the target AN.

S802. The NWDA reselects the target AS for the first UE based on a pre-created network link model and/or information about the target UPF, where the network link model is created based on one or more of information about second UE, location information of an AN connected to second UE, location information of a UPF that provides a user plane service for second UE, location information of an AS that provides an application service for second UE, and quality of service of second UE, and the information about the second UE includes one or more of location information, a movement trajectory, and a movement speed.

The network link model is pre-learned and generated, and is established based on big data. The NWDA obtains, in advance, one or more of information about one or more second UEs, a source AN connected to each second UE, a target AN connected to each second UE, a source UPF of each second UE, a target UPF of each second UE, a source AS of each second UE, a target AS of each second UE, and quality of service of each second UE, to create the network link model based on location information of these devices and the like. The information about the second UE includes one or more of the location information of the second UE, the movement trajectory of the second UE, and the movement speed of the second UE.

The NWDA creates the network link model by obtaining a data flow of an application, QoS of the data flow of the application, a distance model between the UE, an AN, a UPF, and an AS, a mobile handover time of the UE, and the like. Specifically, the NWDA obtains network deployment information from the application server AS, analyzes the data flow of the application, and obtains QoS requirement information of the application. The NWDA subscribes to the mobile handover event of the UE from the AN or the UE, monitors a data flow of the UE, and obtains related information about the UE, including the location information, a movement trajectory, and a movement speed. The information may also be obtained from the application server. Based on obtained related information about the UE, the AN, the UPF, and the AS, and distance information between the UE, the AN, the UPF, and the AS, the NWDA analyzes an impact on the QoS of the data flow of the application and creates the network link model through big data learning. The NWDA obtains the network link model by collecting and monitoring big data. The model includes a correspondence between the AN, the UPF, and the AS, namely, a mapping relationship between the three. A most appropriate UPF may be determined for different ASs, a most appropriate UPF may be determined for ANs, or a most appropriate AS may be selected for UPFs. Herein, a criterion for determining the most appropriate one may be that one has best QoS.

When a target UPF to which target UE is handed over is determined, a target network link may be obtained by using the foregoing network link model. The target network link includes: the target UE-a target AN-the target UPF-a target AS. Therefore, based on the pre-created network link model, information about the target UE, the target AN to which the target UE is handed over, and the target UPF to which the target UE is handed over, the AS to which the target UE is handed over can be obtained. In addition, a handover time of the UE may be further obtained.

Optionally, after determining the target AS, the NWDA may further send the information about the target UPF to the target AS, so that the target AS determines a UPF that provides a data transmission service for the terminal device after mobile handover is performed on the terminal device. Herein, information about the target AS includes an identifier of the target AS and/or a data network access identifier (DNAI) corresponding to the target AS. Optionally, the NWDA may further send the information about the target AS to the target UPF via the SMF, so that the target UPF can determine an AS that provides a data transmission service for the terminal device after the mobile handover is performed on the terminal device.

Optionally, the NWDA may further send the information about the target UPF to the target AN via the AMF, so that the target AN can determine a UPF that provides a data transmission service for the terminal device after the mobile handover is performed on the terminal device.

Optionally, after step S801, and before step S802, the method further includes steps S803 to S806.

S803. The NWDA sends fifth information to the SMF, where the fifth information is used by the SMF to determine whether to reselect the target UPF for the first UE. The fifth information may be sent to the SMF via a PCF. Specifically, information sent to the PCF may be different from the fifth information sent by the PCF to the SMF. That is, the fifth information may be determined by the PCF.

S804. The SMF receives the fifth information sent by the NWDA, determines, based on the fifth information, whether to reselect the target UPF for the first UE, and performs step S805 if determining to reselect the target UPF for the first UE.

S805. The SMF reselects the target UPF for the first UE.

S806. The SMF sends the information about the target UPF to the NWDA, and the NWDA receives the information about the target UPF sent by the SMF.

The NWDA may subscribe to the mobile handover event of the UE, and the SMF may obtain the mobile handover event of the UE from the NWDA. For example, the NWDA subscribes to the mobile handover event of the UE via the source AN connected to the first UE. Once receiving a response indicating that the target AN agrees to a handover request, the source AN sends the fourth information to the NWDA in a timely manner, and the NWDA sends the fifth information to the SMF. The fifth information may include the identifier of the UE, and optionally, may further include the identifier of the target AN and/or an indication for performing the handover on the UE. Optionally, the fifth information may further include the location information of the UE. The SMF determines an optimal location information of the target UPF based on current location information, a current movement speed, and the like of the UE. The SMF sends the information about the target UPF to the NWDA. The NWDA determines the target AS based on the network link model.

Optionally, after determining the target UPF, the NWDA may further notify the SMF and/or the PCF of the information about the target UPF.

Optionally, the SMF may further send the identifier of the target AN to the target UPF, so that the target UPF can determine an AN that provides a data transmission service for the terminal device after the mobile handover is performed on the terminal device. Alternatively, the SMF creates a tunnel from the target AN to the target UPF, and sends a tunnel identifier to the target UPF, so that the target UPF can determine an AN that provides a data transmission service for the terminal device after the mobile handover is performed on the terminal device.

After determining the target AS, the NWDA may further send the information about the target AS to the source AS. After the source AS determines a location information of the target AS, the source AS needs to pre-deploy or migrate an application service to the target AS, so that the target AS can provide a service for the UE in a timely manner after the UE is handed over. A specific process is as follows.

The source AS stores current running status information of an application program. The source AS sends an application migration request to the target AS, where the application migration request includes at least one of the application program, a current execution state (for example, a phase or progress of execution) of the application program, and a current execution result. The target AS receives the application migration request sent by the source AS, creates an application instance, and resumes the application program based on the current execution state (for example, the phase or progress of execution) of the application program and the current execution result. The target AS sends migration complete information to the source AS. The source AS receives the migration complete information sent by the target AS.

If the NWDA reselects a new target UPF, a new communications path needs to be established. A specific process is as follows.

The source AS adds an identifier EndMarker to the last data packet sent to the UE. The source AS sends the data packet carrying the identifier EndMarker to a source UPF. The source UPF receives the data packet that is sent by the source AS and that carries the identifier EndMarker. The source UPF sends the data packet carrying the identifier EndMarker to the UE. After receiving the data packet carrying the identifier EndMarker, the source UPF establishes a channel between the source UPF and the target UPF. The source UPF forwards received user data packets of the UE to the target UPF. The target UPF receives user data of the UE sent by the source UPF. The target UPF forwards the received user data packets of the UE to the target AS. The NWDA may further send an identifier of the target UPF to the source UPF, so that the source UPF migrates the user data of the UE to the target UPF.

After the foregoing process, a communications path has been established between the UE, the target AN, the target UPF, and the target AS, and the target AS provides a service for the UE via the target UPF and the target AN, to ensure that the service is not interrupted.

In Embodiment 2, after determining that the mobile handover event occurs on the UE, the NWDA instructs the SMF to reselect the target UPF for the UE, and the NWDA reselects the target AS for the UE based on the target UPF and the pre-learned network link model.

In Embodiment 2, the network data analytics NWDA function is introduced, and an application server is instructed, through big data analysis and processing, in advance to make preparations. The data flow of the application is monitored, the QoS of the data flow of the application is analyzed, the related information of the UE, the AN, the UPF, the AS are perceived through subscription, and big data analysis is used, to obtain a training model (including the QoS, the distance model, and the handover time) of the target network link. The training model is used as a basis for QoS adjustment. In addition, a current location, the current movement speed, and a current moving direction of the UE are analyzed, to determine a movement trajectory of the UE, where the movement trajectory is used as a basis for selecting the target AS and the target UPF. Based on big data learning, the application layer is instructed in advance to make preparations, so as to avoid jitter and a packet loss in a moving process of the UE. In Embodiment 2, not only the movement trajectory of the UE is considered, but also a QoS requirement of the data flow of the application is considered.

Compared with an existing method, in Embodiment 2, an expected network link model is obtained by using a big data learning center through big data analysis, and is used as a basis for making preparations in advance. Specific improvements are as follows: (1) It is convenient for the NWDA to obtain and analyze related big data. Normal work of another network element is not affected, and redundant network resources are not occupied. (2) The target AS or UPF is selected based on the movement trajectory of the UE. This is flexible and adaptive, and the handover time and a time for notification in advance can be accurately determined, so that problems such as a premature handover time and time and a delayed handover time and time can be avoided.

It should be noted that, in Embodiment 1, after obtaining the mobile handover event of the UE, the NEF separately notifies the SMF and the source AS, so that the SMF reselects the UPF for the UE, and the source AS reselects the target AS for the UE, so as to perform the handover. In Embodiment 2, after obtaining the mobile handover event of the UE, the NWDA instructs the SMF to reselect the UPF for the UE, and then the NWDA determines the target AS based on the UPF reselected by the SMF and the pre-established network link model.

Embodiment 3

Figure 9:
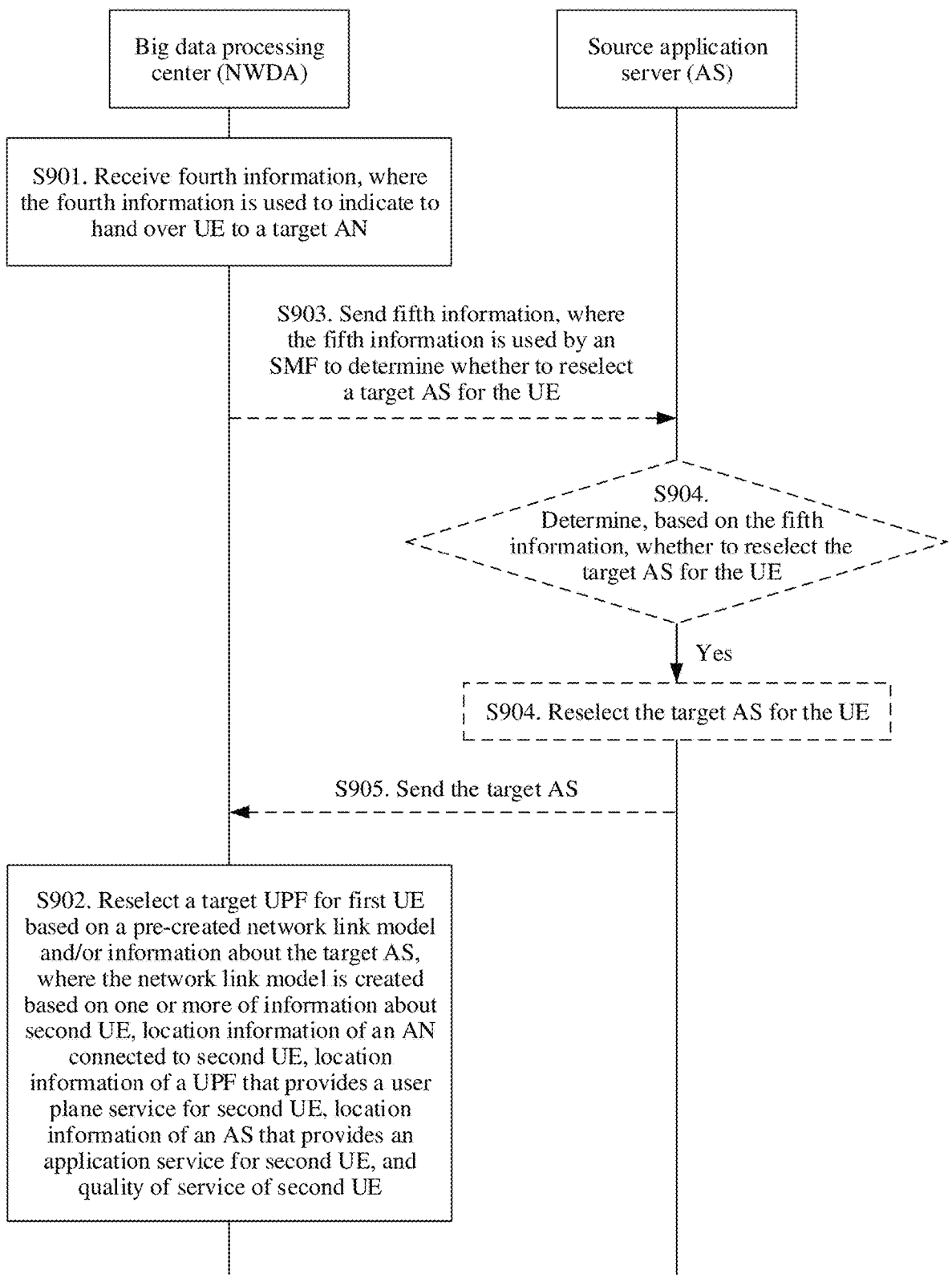
FIG. 9 is a schematic flowchart of another mobile handover method according to an embodiment of the present invention.

An embodiment of the present invention provides a mobile handover method. FIG. 9 is a schematic flowchart of a mobile handover method according to Embodiment 3 of the present invention. In this embodiment of the present invention, an example in which a fourth network device is an NWDA, a fifth network device is a target AS, a sixth network device is a target UPF, and a seventh network device is a source AS is used for description. The mobile handover method includes but is not limited to the following steps.

S901. The NWDA receives fourth information, where the fourth information indicates handover of first UE from a source AN to a target AN.

A manner in which the NWDA obtains the fourth information may be as follows: The NWDA subscribes to a mobile handover event of UE from the source AN via an AMF, and the NWDA receives the fourth information sent by the source AN, where the fourth information is that the source AN reports the mobile handover event to the NWDA in a handover preparation phase. For example, after receiving a response message that indicates that the handover is agreed and that is sent by the target AN, the source AN sends the fourth information to the NWDA, where the fourth information indicates handover of the UE from the source AN to the target AN.

Alternatively, a manner in which the NWDA obtains the fourth information may be as follows: The NWDA receives the fourth information sent by an NEF, where the fourth information is received by the NEF from the source AN. For example, after receiving a response message that indicates that the handover is agreed and that is sent by the target AN, the source AN sends mobile handover information to the NEF, where the mobile handover information indicates handover of the UE from the source AN to the target AN. After receiving the mobile handover information sent by the source AN, the NEF sends the fourth information to the NWDA. The source AN may send the fourth information to the NWDA in a handover preparation phase or a handover execution phase. For details, refer to the description of a case in which the source AN notifies the NEF of the mobile handover event of the UE in FIG. 6A-1 and FIG. 6A-2 in the foregoing embodiment. Details are not described herein again.

Optionally, the fourth information may be a specific message, and the message may indicate handover of the UE from the source AN to the target AN. For example, the message includes at least one of an identifier of the UE, an identifier of the source AN, or an identifier of the target AN. Optionally, the fourth information may further include indication information indicating that the UE performs an AN handover event. Alternatively, the fourth information may be a field carried in the message, and the field is used to indicate handover of the UE from the source AN to the target AN. For example, the field includes at least one of an identifier of the UE, an identifier of the source AN, or an identifier of the target AN. Optionally, the fourth information may further include indication information indicating that the UE performs an AN handover event.

S902. The NWDA reselects the target UPF for the first UE based on a pre-created network link model and/or information about the target AS, where the network link model is created based on one or more of information about second UE, location information of an AN connected to second UE, location information of a UPF that provides a user plane service for second UE, location information of an AS that provides an application service for second UE, and quality of service of second UE, and the information about the second UE includes one or more of location information, a movement trajectory, and a movement speed.

The network link model is pre-learned and generated, and is established based on big data. The NWDA obtains, in advance, one or more of information about one or more second UEs, a source AN connected to each second UE, a target AN connected to each second UE, a source UPF of each second UE, a target UPF of each second UE, a source AS of each second UE, a target AS of each second UE, and quality of service of each second UE, to create the network link model based on location information of these devices and the like. The information about the second UE includes one or more of the location information of the second UE, the movement trajectory of the second UE, and the movement speed of the second UE.

The NWDA creates the network link model by obtaining a data flow of an application, QoS of the data flow of the application, a distance model between the UE, an AN, a UPF, and an AS, a mobile handover time of the UE, and the like. Specifically, the NWDA obtains network deployment information from the application server AS, analyzes the data flow of the application, and obtains QoS requirement information of the application. The NWDA subscribes to the mobile handover event of the UE from the AN or the UE, monitors a data flow of the UE, and obtains related information about the UE, including location information, a movement trajectory, and a movement speed. The information may also be obtained from the application server. Based on obtained related information about the UE, the AN, the UPF, and the AS, and distance information between the UE, the AN, the UPF, and the AS, the NWDA analyzes an impact on the QoS of the data flow of the application and creates the network link model through big data learning. The NWDA obtains the network link model by collecting and monitoring big data. The model includes a correspondence between the AN, the UPF, and the AS, namely, a mapping relationship between the three. A most appropriate UPF may be determined for different ASs, a most appropriate UPF may be determined for ANs, or a most appropriate AS may be selected for UPFs. Herein, a criterion for determining the most appropriate one may be that one has best QoS.

When a target AS to which target UE is handed over is determined, a target network link may be obtained by using the foregoing network link model. The target network link includes: the target UE-a target AN-a target UPF-the target AS. Therefore, based on the pre-created network link model, information about the target UE, the target AN to which the target UE is handed over, and the target AS to which the target UE is handed over, the UPF to which the target UE is handed over can be obtained. In addition, a handover time of the UE may be further obtained.

Optionally, after determining information about the target UPF, the NWDA may further send the information about the target UPF to the target AS, so that the target AS determines a UPF that provides a data transmission service for the terminal device after mobile handover is performed on the terminal device. Herein, information about the target AS includes an identifier of the target AS and/or a data network access identifier (DNAI) corresponding to the target AS. Optionally, the NWDA may further send the information about the target AS to the target UPF via an SMF, so that the target UPF can determine an AS that provides a data transmission service for the terminal device after the mobile handover is performed on the terminal device.

Optionally, the NWDA may further send the information about the target UPF to the target AN via the AMF, so that the target AN can determine a UPF that provides a data transmission service for the terminal device after the mobile handover is performed on the terminal device.

Optionally, after determining the target UPF, the NWDA may further notify the SMF of the target UPF. The SMF may further send the identifier of the target AN to the target UPF, so that the target UPF can determine an AN that provides a data transmission service for the terminal device after the mobile handover is performed on the terminal device. Alternatively, the SMF creates a tunnel from the target AN to the target UPF, and sends a tunnel identifier to the target UPF, so that the target UPF can determine an AN that provides a data transmission service for the terminal device after the mobile handover is performed on the terminal device.

Optionally, after step S901 and before step S902, the method further includes steps S903 to S905.

S903. The NWDA sends fifth information to a source AS, where the fifth information is used by the source AS to determine whether to reselect the target AS for the first UE.

S904. The source AS receives the fifth information sent by the NWDA, determines, based on the fifth information, whether to reselect the target AS for the first UE, and reselects the target AS for the first UE if determining that the target AS needs to be reselected for the first UE.

S905. The source AS sends the information about the target AS to the NWDA, and the NWDA receives the information about the target AS sent by the source AS.

The NWDA may subscribe to the mobile handover event of the UE, and the SMF may obtain the mobile handover event of the UE from the NWDA. For example, the NWDA subscribes to the mobile handover event of the UE via the source AN connected to the first UE. Once receiving the response indicating that the target AN agrees to a handover request, the source AN sends the fourth information to the NWDA in a timely manner, and the NWDA sends the fifth information to the source AS. The fifth information may include the identifier of the UE and the identifier of the target AN. The source AS determines an optimal location information of the target AS based on current location information, a current movement speed, and the like of the UE. The source AS sends location information of the target AS to the NWDA. The NWDA determines the target UPF based on the network link model. The source AS may further determine, based on current quality of service of the UE, whether to reselect the target AS for the UE.

The source AS determines the location information of the target application server based on a movement trend of the UE. A specific process is as follows. The source AS sends a request for QoS to a PCF. The NWDA may subscribe to the mobile handover event of the UE. The source AS may obtain information such as the current location, the current movement speed, and a current moving direction of the UE from the NWDA, may learn of the movement trajectory (based on GPS) of the UE, and may determine a specific location information of the target AS based on QoS information requested by the UE. The source AS sends location information of the target AS to the NWDA. The NWDA determines the target UPF based on the network link model.

Optionally, after determining the target UPF, the NWDA may further notify the SMF and the PCF of the target UPF.

After determining the target AS, the NWDA may further send the information about the target AS to the source AS.

After the source AS determines the location information of the target AS, the source AS needs to pre-deploy or migrate an application service to the target AS, so that the target AS can provide a service for the UE in a timely manner after the UE is handed over. A specific process is as follows.

The source AS stores current running status information of an application program. The source AS sends an application migration request to the target AS, where the application migration request includes at least one of the application program, a current execution state (for example, a phase or progress of execution) of the application program, and a current execution result. The target AS receives the application migration request sent by the source AS, creates an application instance, and resumes the application program based on the current execution state (for example, the phase or progress of execution) of the application program and the current execution result. The target AS sends migration complete information to the source AS. The source AS receives the migration complete information sent by the target AS.

If the NWDA reselects a new target UPF, a new communications path needs to be established. A specific process is as follows.

The source AS adds an identifier EndMarker to the last data packet sent to the UE. The source AS sends the data packet carrying the identifier EndMarker to a source UPF. The source UPF receives the data packet that is sent by the source AS and that carries the identifier EndMarker. The source UPF sends the data packet carrying the identifier EndMarker to the UE. After receiving the data packet carrying the identifier EndMarker, the source UPF establishes a channel between the source UPF and the target UPF. The source UPF forwards received user data packets of the UE to the target UPF. The target UPF receives user data of the UE sent by the source UPF. The target UPF forwards the received user data packets of the UE to the target AS. The NWDA may further send an identifier of the target UPF to the source UPF, so that the source UPF migrates the user data of the UE to the target UPF.

After the foregoing process, a communications path has been established between the UE, the target AN, the target UPF, and the target AS, and the target AS provides a service for the UE via the target UPF and the target AN, to ensure that the service is not interrupted.

In Embodiment 3, after determining that the mobile handover event occurs on the UE, the NWDA instructs the source AS to reselect the target AS for the UE, and the NWDA reselects the target UPF for the UE based on the target AS and the pre-learned network link model.

In Embodiment 3, the network data analytics NWDA function is introduced, and an application layer server is instructed, through big data analysis and processing, in advance to make preparations. The data flow of the application is monitored, the QoS of the data flow of the application is analyzed, the related information of the UE, the AN, the UPF, the AS are perceived through subscription, and big data analysis is used, to obtain a training model (including the QoS, the distance model, and the handover time) of the target network link. The training model is used as a basis for QoS adjustment. In addition, the current location, the current movement speed, and the current moving direction of the UE are analyzed, to determine the movement trajectory of the UE, where the movement trajectory is used as a basis for selecting the target AS and the target UPF. Based on big data learning, an application layer is instructed in advance to make preparations, so as to avoid jitter and a packet loss in a moving process of the UE. In Embodiment 3, not only the movement trajectory of the UE is considered, but also a QoS requirement of the data flow of the application is considered.

Compared with an existing method, in Embodiment 3, an expected network link model is obtained by using a big data learning center through big data analysis, and the application layer is used as a basis for making preparations in advance. Specific improvements are as follows: (1) It is convenient for the NWDA to obtain and analyze related big data. Normal work of another network element is not affected, and redundant network resources are not occupied. (2) The target AS or UPF is selected based on the movement trajectory of the UE. This is flexible and adaptive, and the handover time and a time for notification in advance can be accurately determined, so that problems such as a premature handover time and time and a delayed handover time and time can be avoided.

It should be noted that, in Embodiment 1, after obtaining the mobile handover event of the UE, the NEF separately notifies the SMF and the source AS, so that the SMF reselects the UPF for the UE, and the source AS reselects the target AS for the UE, so as to perform the handover. In Embodiment 3, after obtaining the mobile handover event of the UE, the NWDA instructs the source AS to reselect the AS for the UE, and then the NWDA determines the target UPF based on the target AS reselected by the source AS and the pre-established network link model.

Figure 10:
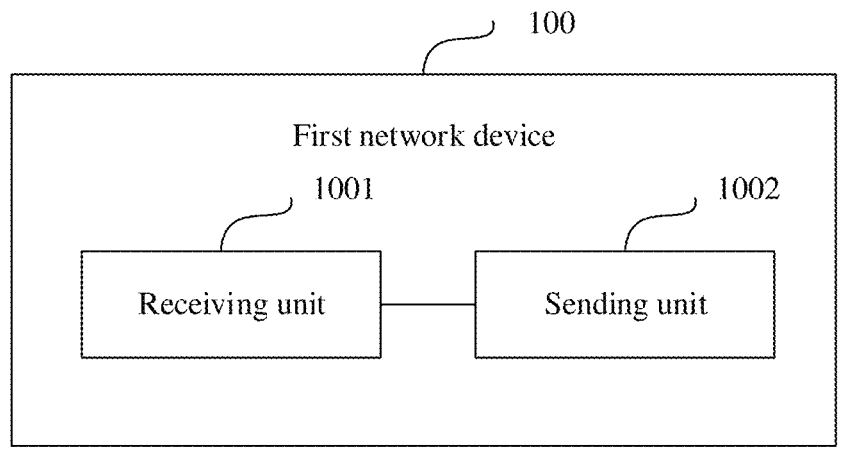
FIG. 10 is a structural block diagram of a network device according to an embodiment of the present invention.

FIG. 10 is a schematic structural diagram of a network device according to an embodiment of the present invention. As shown in FIG. 10, a first network device 100 includes a receiving unit 1001 and a sending unit 1002.

In this embodiment of the present invention, the receiving unit 1001 is configured to receive first information, where the first information indicates handover of a first terminal device to a target access network device.

The sending unit 1002 is configured to send second information to a second network device based on the first information, where the second information is used by the second network device to determine whether to reselect a target user plane function device for the first terminal device; and/or the sending unit 1002 is further configured to send third information to a third network device based on the first information, where the third information is used by the third network device to determine whether to reselect a target application server for the first terminal device.

In this embodiment, the first network device 100 is presented in a form of a functional unit. The "unit" herein may be an ASIC, a processor and a memory that execute one or more software or firmware programs, an integrated logic circuit, and/or another component that can provide the foregoing functions. The first network device 100 may be in the form shown in FIG. 5. The receiving unit 1001 may be implemented by using the network interface 503 in FIG. 5, and the sending unit 1002 may be implemented by using the network interface 503 in FIG. 5.

Optionally, the receiving unit 1001 is specifically configured to: receive the first information sent by a source access network device, where the first information is sent by the source access network device when the source access network device determines that the first terminal device is handed over.

Optionally, the second information includes information about the target access network device, and the information about the target access network device is used by the second network device to determine whether to reselect the target user plane function device for the first terminal device. Alternatively, the second information includes information about the target application server, and the information about the target application server is used by the second network device to determine whether to reselect the target user plane function device for the first terminal device.

Optionally, the third information includes the information about the target access network device, and the information about the target access network device is used by the third network device to determine whether to reselect the target application server for the first terminal device.

Alternatively, the receiving unit is further configured to receive information about the target user plane function device sent by the second network device, where the third information includes the information about the target user plane function device, and the information about the target user plane function device is used by the third network device to determine whether to reselect the target application server for the first terminal device.

Optionally, the first network device includes a network exposure function NEF device, and/or the second network device includes a session management function SMF device, and/or the third network device includes a source application server AS already connected to the first terminal device.

Figure 7:
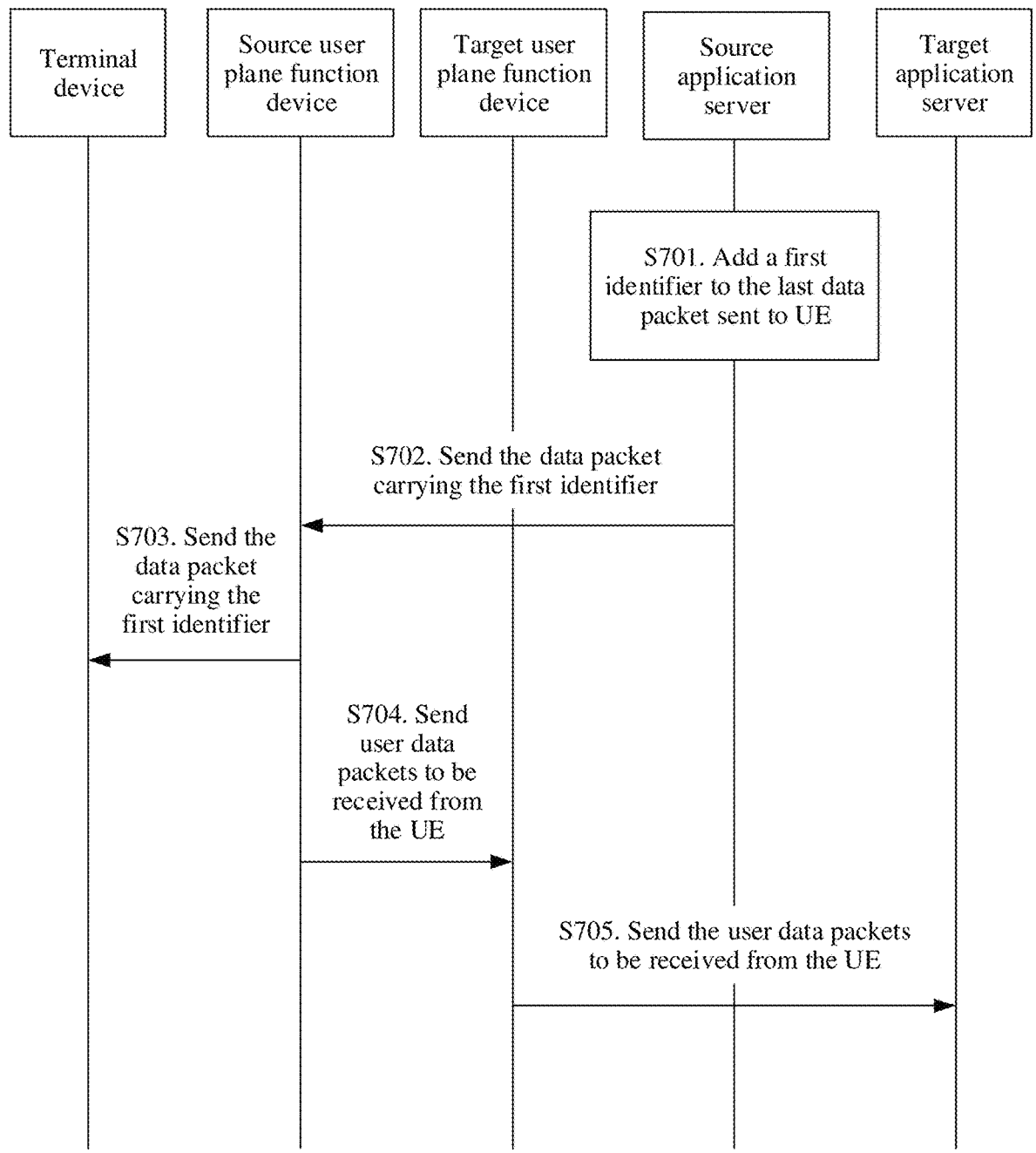
FIG. 7 is a schematic flowchart of another mobile handover method according to an embodiment of the present invention.

It should be noted that, for functions of functional modules in the first network device 100 described in this embodiment of the present invention, refer to related descriptions of the corresponding first network device in the embodiment shown in FIG. 6 or FIG. 7. Details are not described herein again.

Figure 11:
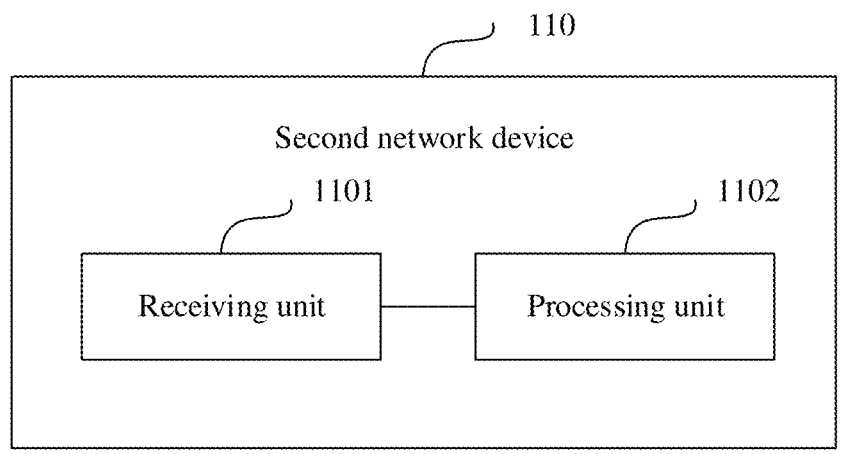
FIG. 11 is a structural block diagram of another network device according to an embodiment of the present invention.

FIG. 11 is a schematic structural diagram of another network device according to an embodiment of the present invention. As shown in FIG. 11, a second network device 11o includes a receiving unit 1101 and a processing unit 1102.

In this embodiment of the present invention, the receiving unit 1101 is configured to receive second information sent by a first network device, where the second information is sent by the first network device when the first network device learns that a first terminal device is handed over to a target access network device.

The processing unit 1102 is configured to determine, based on the second information, whether to reselect a target user plane function device for the first terminal device.

In this embodiment, the second network device 110 is presented in a form of a functional unit. The "unit" herein may be an ASIC, a processor and a memory that execute one or more software or firmware programs, an integrated logic circuit, and/or another component that can provide the foregoing functions. The second network device 110 may be in the form shown in FIG. 5. The receiving unit 1101 may be implemented by using the network interface 503 in FIG. 5, and the processing unit 1102 may be implemented by using the processor 501 in FIG. 5.

Optionally, the processing unit 1102 is further configured to reselect a target user plane function device for the first terminal device after the processing unit determines, based on the second information, whether to reselect the target user plane function device for the first terminal device.

The second network device 11o further includes: a sending unit, configured to send information about the target user plane function device to the first network device.

Optionally, the second information includes information about the target access network device. That the processing unit is configured to determine, based on the second information, whether to reselect the target user plane function device for the first terminal device is specifically: determining, based on location information of the target access network device, whether to reselect the target user plane function device for the first terminal device.

Alternatively, the second information includes information about a target application server reselected by a third network device for the first terminal device. That the processing unit is configured to determine, based on the second information, whether to reselect the target user plane function device for the first terminal device is specifically: determining, based on location information of the target application server, whether to reselect the target user plane function device for the first terminal device.

Optionally, the first network device includes a network exposure function NEF device, and/or the second network device includes a session management function SMF device.

It should be noted that, for functions of functional modules in the second network device 110 described in this embodiment of the present invention, refer to related descriptions of the corresponding second network device in the embodiment shown in FIG. 6 or FIG. 7. Details are not described herein again.

Figure 12:
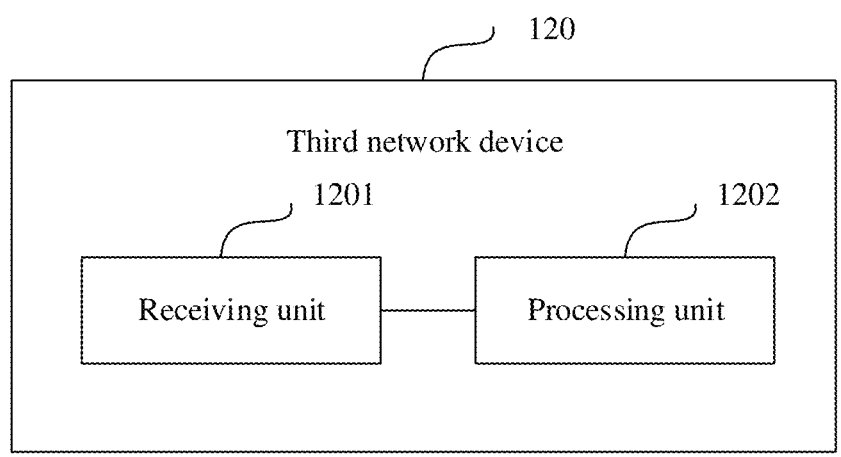
FIG. 12 is a structural block diagram of another network device according to an embodiment of the present invention.

FIG. 12 is a schematic structural diagram of another network device according to an embodiment of the present invention. As shown in FIG. 12, a third network device 120 includes a receiving unit 1201 and a processing unit 1202.

In this embodiment of the present invention, the receiving unit 1201 is configured to receive third information sent by a first network device, where the third information is sent by the first network device when the first network device learns that a first terminal device is handed over to a target access network device.

The processing unit 1202 is configured to determine, based on the third information, whether to reselect a target application server for the first terminal device.

In this embodiment, the third network device 120 is presented in a form of a functional unit. The "unit" herein may be an ASIC, a processor and a memory that execute one or more software or firmware programs, an integrated logic circuit, and/or another component that can provide the foregoing functions. The third network device 120 may be in the form shown in FIG. 5. The receiving unit 1201 may be implemented by using the network interface 503 in FIG. 5, and the processing unit 1202 may be implemented by using the processor 501 in FIG. 5.

Optionally, the third information includes information about the target access network device. That the processing unit 1202 is configured to determine, based on the third information, whether to reselect the target application server for the first terminal device is specifically: determining, based on location information of the target access network device, whether to reselect the target application server for the first terminal device.

Alternatively, the third information includes information about a target user plane function device reselected by a second network device for the first terminal device. That the processing unit is configured to determine, based on the third information, whether to reselect the target application server for the first terminal device is specifically: determining, based on location information of the target user plane function device, whether to reselect the target application server for the first terminal device.

Alternatively, that the processing unit is configured to determine, based on the third information, whether to reselect the target application server for the first terminal device is specifically: determining, based on current quality of service of the first terminal device, whether to reselect the target application server for the first terminal device.

Optionally, the processing unit 1202 is further configured to reselect the target application server for the first terminal device based on one or more of the current quality of service of the first terminal device, the location information of the target access network device to which the first terminal device is handed over, or the information about the target user plane function device.

The processing unit 1202 is further configured to add a first identifier to the last one or more data packets sent to the first terminal device.

The third network device 120 further includes: a sending unit, configured to send, to the first terminal device via a source user plane function device, a data packet carrying the first identifier, where the first identifier is used to indicate the source user plane function device to hand over data of the first terminal device to the target user plane function device.

Optionally, the first network device includes a network exposure function NEF device, and/or the third network device includes a source application server AS already connected to the first terminal device.

It should be noted that, for functions of functional modules in the third network device 120 described in this embodiment of the present invention, refer to related descriptions of the corresponding third network device in the embodiment shown in FIG. 6 or FIG. 7. Details are not described herein again.

Figure 13:
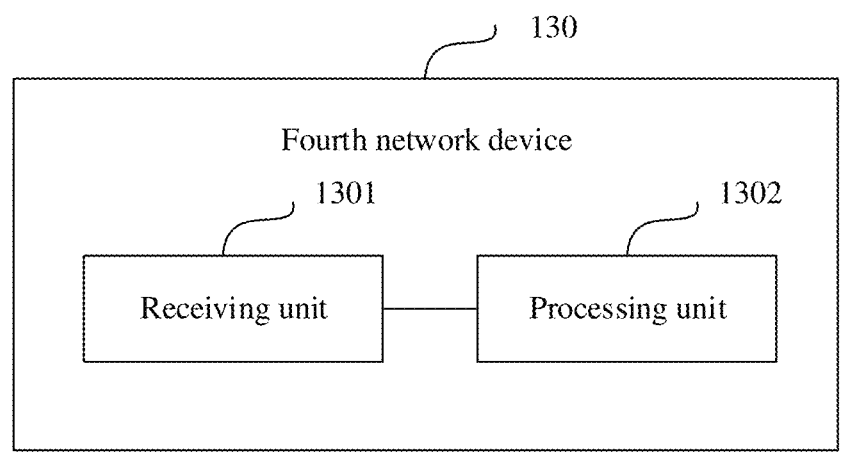
FIG. 13 is a structural block diagram of another network device according to an embodiment of the present invention.

FIG. 13 is a schematic structural diagram of another network device according to an embodiment of the present invention. As shown in FIG. 13, a fourth network device 130 includes a receiving unit 1301 and a processing unit 1302.

In this embodiment of the present invention, the receiving unit 1301 is configured to receive fourth information, where the fourth information indicates handover of a first terminal device to a target access network device.

The processing unit 1302 is configured to reselect a sixth network device for the first terminal device based on a pre-created network link model and/or information about a fifth network device, where the fifth network device is a target user plane function device determined for the first terminal device, and the sixth network device is a target application server determined for the first terminal device; or the fifth network device is a target application server determined for the first terminal device, and the sixth network device is a target user plane function device determined for the first terminal device; and the network link model is created based on one or more of information about a second terminal device, location information of an access network device connected to the second terminal device, location information of a user plane function device that provides a user plane service for the second terminal device, location information of an application server that provides an application service for the second terminal device, and quality of service of the second terminal device, where the information about the second terminal device includes one or more of location information, a movement trajectory, and a movement speed.

In this embodiment, the fourth network device 130 is presented in a form of a functional unit. The "unit" herein may be an ASIC, a processor and a memory that execute one or more software or firmware programs, an integrated logic circuit, and/or another component that can provide the foregoing functions. The fourth network device 130 may be in the form shown in FIG. 5. The receiving unit 1301 may be implemented by using the network interface 503 in FIG. 5, and the processing unit 1302 may be implemented by using the processor 501 in FIG. 5.

Optionally, the fourth network device 130 further includes: a sending unit, configured to: after the receiving unit receives the fourth information, and before the processing unit reselects the sixth network device for the first terminal device based on the pre-created network link model and/or the information about the fifth network device, send fifth information to a seventh network device, where the fifth information is used by the seventh network device to determine whether to reselect the fifth network device for the first terminal device.

The receiving unit 1301 is further configured to receive the information about the fifth network device sent by the seventh network device.

The seventh network device is a session management function device, the fifth network device is the target user plane function device determined for the first terminal device, and the sixth network device is the target application server determined for the first terminal device. Alternatively, the seventh network device is a source application server already connected to the first terminal device, the fifth network device is the target application server determined for the first terminal device, and the sixth network device is the target user plane function device determined for the first terminal device.

Optionally, that the receiving unit 1301 is configured to receive the fourth information includes: receiving the fourth information sent by the source access network device, where the fourth information is sent by the source access network device when the source access network device determines that the first terminal device is handed over; or receiving the fourth information sent by a network exposure function NEF device, where the fourth information is received by the NEF from the source access network device.

Optionally, the fourth network device includes a network data analytics NWDA function.

It should be noted that, for functions of functional modules in the fourth network device 130 described in this embodiment of the present invention, refer to related descriptions of the corresponding fourth network device in the embodiment shown in FIG. 8 or FIG. 9. Details are not described herein again.

Figure 14:
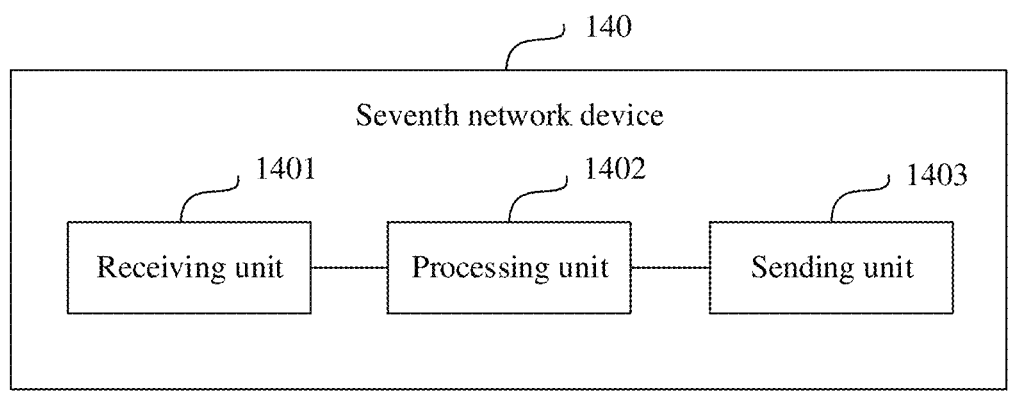
FIG. 14 is a structural block diagram of another network device according to an embodiment of the present invention.

FIG. 14 is a schematic structural diagram of another network device according to an embodiment of the present invention. As shown in FIG. 14, a seventh network device 140 includes a receiving unit 1401, a processing unit 1402, and a sending unit 1403.

In this embodiment of the present invention, the receiving unit 1401 is configured to receive fifth information sent by a fourth network device, where the fifth information is sent by the fourth network device when the fourth network device learns that a first terminal device is handed over to a target access network device.

The processing unit 1402 is configured to determine, based on the fifth information, whether to reselect the fifth network device for the first terminal device.

The sending unit 1403 is configured to: send information about the fifth network device to the fourth network device, where the information about the fifth network device is used by the fourth network device to determine a sixth network device for the first terminal device, where the seventh network device is a session management function device, the fifth network device is a target user plane function device determined for the first terminal device, and the sixth network device is a target application server determined for the first terminal device; or the seventh network device is a source application server already connected to the first terminal device, the fifth network device is a target application server determined for the first terminal device, and the sixth network device is a target user plane function device determined for the first terminal device.

In this embodiment, the seventh network device 140 is presented in a form of a functional unit. The "unit" herein may be an ASIC, a processor and a memory that execute one or more software or firmware programs, an integrated logic circuit, and/or another component that can provide the foregoing functions. The seventh network device 140 may be in the form shown in FIG. 5. The receiving unit 1401 may be implemented by using the network interface 503 in FIG. 5, the processing unit 1402 may be implemented by using the processor 501 in FIG. 5, and the sending unit 1403 may be implemented by using the network interface 503 in FIG. 5.

It should be noted that, for functions of functional modules in the seventh network device 140 described in this embodiment of the present invention, refer to related descriptions of the corresponding seventh network device in the embodiment shown in FIG. 8 or FIG. 9. Details are not described herein again.

Methods or algorithm steps described in combination with the content disclosed in this embodiment of the present invention may be implemented by hardware, or may be implemented by a processor by executing a software program instruction. The software program instruction may include a corresponding software module. The software module may be stored in a RAM, a flash memory, a ROM, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a transceiver or a relay device. Certainly, the processor and the storage medium may exist in the first network device or the second network device as discrete components.

A person skilled in the art should be aware that in the foregoing one or more examples, functions described in the embodiments of the present invention may be implemented by hardware, software, firmware, or any combination thereof. When the functions are implemented by software, the functions may be stored in a computer-readable medium or transmitted as one or more program instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A method comprising:
receiving, by a first core network device, an indication indicating that a terminal device is to be handed over to a target access network device, the indication being sent by a source access network in a handover preparation phase;
sending, by the first core network device to a second core network device, the indication indicating that the terminal device is to be handed over to the target access network device;
receiving, by the second core network device from the first core network device, the indication;
receiving, by the second core network device from a first application server, application server information corresponding to the target access network device; and
reselecting, by the second core network device based on the indication and the application server information, a target user plane function device for serving the terminal device.

2. The method according to claim 1, wherein the application server information comprises a data network access identifier.

3. The method according to claim 1, wherein the second core network device is a session management function device.

4. The method according to claim 1, wherein the first core network device is a network exposure function device.

5. The method according to claim 1, wherein the target user plane function device provides a user plane service for the terminal device.

6. The method according to claim 1, wherein the target user plane function device provides data packet routing, filtering, and forwarding for the terminal device.

7. A system comprising:
a first core network device, configured to:
receive an indication indicating that a terminal device is to be handed over to a target access network device, the indication being sent by a source access network in a handover preparation phase, and
send the indication to a second core network device, wherein the indication indicates that the terminal device is to be handed over to the target access network device; and
the second core network device, configured to:
receive, from a first application server, application server information corresponding to the target access network device, and
reselect, based on the indication and the application server information, a target user plane function device for serving the terminal device.

8. The system according to claim 7, wherein the application server information comprises a data network access identifier.

9. The system according to claim 7, wherein the second core network device is a session management function device.

10. The system according to claim 7, wherein the first core network device is a network exposure function device.

11. The system according to claim 7, wherein the target user plane function device provides a user plane service for the terminal device.

12. The system according to claim 7, wherein the target user plane function device provides data packet routing, filtering, and forwarding for the terminal device.

13. An apparatus comprising:
a memory, configured to store an instruction; and
at least one processor, configured to invoke the instruction from the memory and run the instruction to cause the apparatus to:
receive an indication indicating that a terminal device is to be handed over to a target access network device, the indication being sent by a source access network in a handover preparation phase;
receive, from a core network device, the indication indicating that the terminal device is to be handed over to the target access network device;
receive, from a first application server, application server information corresponding to the target access network device; and
reselect, based on the indication and the application server information, a target user plane function device for serving the terminal device.

14. The apparatus according to claim 13, wherein the application server information comprises a data network access identifier.

15. The apparatus according to claim 13, wherein the apparatus is a session management function device.

16. The apparatus according to claim 13, wherein the core network device is a network exposure function device.

17. The apparatus according to claim 13, wherein the target user plane function device provides a user plane service for the terminal device.

* * * * *